US011790664B2

(12) United States Patent
Musk et al.

(10) Patent No.: US 11,790,664 B2
(45) Date of Patent: *Oct. 17, 2023

(54) ESTIMATING OBJECT PROPERTIES USING VISUAL IMAGE DATA

(71) Applicant: Tesla, Inc., Austin, TX (US)

(72) Inventors: James Anthony Musk, San Francisco, CA (US); Swupnil Kumar Sahai, Saratoga, CA (US); Ashok Kumar Elluswamy, Sunnyvale, CA (US)

(73) Assignee: Tesla, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/656,183

(22) Filed: Mar. 23, 2022

(65) Prior Publication Data

US 2022/0284712 A1    Sep. 8, 2022

Related U.S. Application Data

(63) Continuation of application No. 17/249,110, filed on Feb. 19, 2021, now Pat. No. 11,288,524, which is a
(Continued)

(51) Int. Cl.
*G06V 20/58* (2022.01)
*G06T 7/70* (2017.01)
(Continued)

(52) U.S. Cl.
CPC ............. *G06V 20/58* (2022.01); *G06N 20/00* (2019.01); *G06T 7/70* (2017.01); *G06V 10/803* (2022.01);
(Continued)

(58) Field of Classification Search
CPC .... G06V 20/58; G06V 20/584; G06V 10/803; G06T 7/70; G06T 2207/20081; G06T 2207/30261; G06N 20/00
See application file for complete search history.

(56) References Cited

U.S. PATENT DOCUMENTS 6,882,755 B2    5/2005  Silverstein et al.
7,209,031 B2    4/2007  Nakai et al.
(Continued)

FOREIGN PATENT DOCUMENTS

AU    2019261735 A1    6/2020
AU    2019201716 A1    10/2020
(Continued)

OTHER PUBLICATIONS

International Search Report and Written Opinion dated May 28, 2020 in PCT/US2020/017290.

*Primary Examiner* — John J Lee
(74) *Attorney, Agent, or Firm* — Knobbe, Martens, Olson & Bear, LLP

(57) ABSTRACT

A system is comprised of one or more processors coupled to memory. The one or more processors are configured to receive image data based on an image captured using a camera of a vehicle and to utilize the image data as a basis of an input to a trained machine learning model to at least in part identify a distance of an object from the vehicle. The trained machine learning model has been trained using a training image and a correlated output of an emitting distance sensor.

15 Claims, 6 Drawing Sheets

Related U.S. Application Data continuation of application No. 16/279,657, filed on Feb. 19, 2019, now Pat. No. 10,956,755.

(51) Int. Cl.
*G06N 20/00* (2019.01)
*G06V 10/80* (2022.01)

(52) U.S. Cl.
CPC .. *G06V 20/584* (2022.01); *G06T 2207/20081* (2013.01); *G06T 2207/30261* (2013.01)

(56) References Cited

U.S. PATENT DOCUMENTS

| | | | |
|---|---|---|---|
| 7,747,070 B2 | 6/2010 | Puri | |
| 7,904,867 B2 | 3/2011 | Burch et al. | |
| 7,974,492 B2 | 7/2011 | Nishijima | |
| 8,165,380 B2 | 4/2012 | Choi et al. | |
| 8,369,633 B2 | 2/2013 | Lu et al. | |
| 8,406,515 B2 | 3/2013 | Cheatle et al. | |
| 8,509,478 B2 | 8/2013 | Haas et al. | |
| 8,588,470 B2 | 11/2013 | Rodriguez et al. | |
| 8,744,174 B2 | 6/2014 | Hamada et al. | |
| 8,773,498 B2 | 7/2014 | Lindbergh | |
| 8,912,476 B2 | 12/2014 | Fogg et al. | |
| 8,913,830 B2 | 12/2014 | Sun et al. | |
| 8,928,753 B2 | 1/2015 | Han et al. | |
| 8,972,095 B2 | 3/2015 | Furuno et al. | |
| 8,976,269 B2 | 3/2015 | Duong | |
| 9,008,422 B2 | 4/2015 | Eid et al. | |
| 9,081,385 B1 | 7/2015 | Ferguson et al. | |
| 9,275,289 B2 | 3/2016 | Li et al. | |
| 9,586,455 B2 | 3/2017 | Sugai et al. | |
| 9,672,437 B2 | 6/2017 | McCarthy | |
| 9,710,696 B2 | 7/2017 | Wang et al. | |
| 9,738,223 B2 | 8/2017 | Zhang et al. | |
| 9,754,154 B2 | 9/2017 | Craig et al. | |
| 9,767,369 B2 | 9/2017 | Furman et al. | |
| 9,965,865 B1 | 5/2018 | Agrawal et al. | |
| 10,133,273 B2 | 11/2018 | Linke | |
| 10,140,252 B2 | 11/2018 | Fowers et al. | |
| 10,140,544 B1 | 11/2018 | Zhao et al. | |
| 10,146,225 B2 | 12/2018 | Ryan | |
| 10,152,655 B2 | 12/2018 | Krishnamurthy et al. | |
| 10,167,800 B1 | 1/2019 | Chung et al. | |
| 10,169,680 B1 | 1/2019 | Sachdeva et al. | |
| 10,192,016 B2 | 1/2019 | Ng et al. | |
| 10,216,189 B1 | 2/2019 | Haynes | |
| 10,228,693 B2 | 3/2019 | Micks et al. | |
| 10,242,293 B2 | 3/2019 | Shim et al. | |
| 10,248,121 B2 | 4/2019 | VandenBerg, III | |
| 10,262,218 B2 | 4/2019 | Lee et al. | |
| 10,282,623 B1 | 5/2019 | Ziyaee et al. | |
| 10,296,828 B2 | 5/2019 | Viswanathan | |
| 10,303,961 B1 | 5/2019 | Stoffel et al. | |
| 10,310,087 B2 | 6/2019 | Laddha et al. | |
| 10,311,312 B2 | 6/2019 | Yu et al. | |
| 10,318,848 B2 | 6/2019 | Dijkman et al. | |
| 10,325,178 B1 | 6/2019 | Tang et al. | |
| 10,331,974 B2 | 6/2019 | Zia et al. | |
| 10,338,600 B2 | 7/2019 | Yoon et al. | |
| 10,343,607 B2 | 7/2019 | Kumon | |
| 10,359,783 B2 | 7/2019 | Williams et al. | |
| 10,366,290 B2 | 7/2019 | Wang et al. | |
| 10,372,130 B1 | 8/2019 | Kaushansky et al. | |
| 10,373,019 B2 | 8/2019 | Nariyambut Murali et al. | |
| 10,373,026 B1 | 8/2019 | Kim et al. | |
| 10,380,741 B2 | 8/2019 | Yedla et al. | |
| 10,394,237 B2 | 8/2019 | Xu et al. | |
| 10,395,144 B2 | 8/2019 | Zeng et al. | |
| 10,402,646 B2 | 9/2019 | Klaus | |
| 10,402,986 B2 | 9/2019 | Ray et al. | |
| 10,414,395 B1 | 9/2019 | Sapp et al. | |
| 10,423,934 B1 | 9/2019 | Zanghi et al. | |
| 10,436,615 B2 | 10/2019 | Agarwal et al. | |
| 10,452,905 B2 | 10/2019 | Segalovitz et al. | |
| 10,460,053 B2 | 10/2019 | Olson et al. | |
| 10,467,459 B2 | 11/2019 | Chen et al. | |
| 10,468,008 B2 | 11/2019 | Beckman et al. | |
| 10,468,062 B1 | 11/2019 | Levinson et al. | |
| 10,470,510 B1 | 11/2019 | Koh et al. | |
| 10,474,160 B2 | 11/2019 | Huang et al. | |
| 10,474,161 B2 | 11/2019 | Huang et al. | |
| 10,474,928 B2 | 11/2019 | Sivakumar et al. | |
| 10,489,126 B2 | 11/2019 | Kumar et al. | |
| 10,489,972 B2 | 11/2019 | Atsmon | |
| 10,503,971 B1 | 12/2019 | Dang et al. | |
| 10,514,711 B2 | 12/2019 | Bar-Nahum et al. | |
| 10,528,824 B2 | 1/2020 | Zou | |
| 10,529,078 B2 | 1/2020 | Abreu et al. | |
| 10,529,088 B2 | 1/2020 | Fine et al. | |
| 10,534,854 B2 | 1/2020 | Sharma et al. | |
| 10,535,191 B2 | 1/2020 | Sachdeva et al. | |
| 10,542,930 B1 | 1/2020 | Sanchez et al. | |
| 10,546,197 B2 | 1/2020 | Shrestha et al. | |
| 10,546,217 B2 | 1/2020 | Albright et al. | |
| 10,552,682 B2 | 2/2020 | Jonsson et al. | |
| 10,559,386 B1 | 2/2020 | Neuman | |
| 10,565,475 B2 | 2/2020 | Lecue et al. | |
| 10,567,674 B2 | 2/2020 | Kirsch | |
| 10,568,570 B1 | 2/2020 | Sherpa et al. | |
| 10,572,717 B1 | 2/2020 | Zhu et al. | |
| 10,574,905 B2 | 2/2020 | Srikanth et al. | |
| 10,579,058 B2 | 3/2020 | Oh et al. | |
| 10,579,063 B2 | 3/2020 | Haynes et al. | |
| 10,579,897 B2 | 3/2020 | Redmon et al. | |
| 10,586,280 B2 | 3/2020 | McKenna et al. | |
| 10,591,914 B2 | 3/2020 | Palanisamy et al. | |
| 10,592,785 B2 | 3/2020 | Zhu et al. | |
| 10,599,701 B2 | 3/2020 | Liu | |
| 10,599,930 B2 | 3/2020 | Lee et al. | |
| 10,599,958 B2 | 3/2020 | He et al. | |
| 10,606,990 B2 | 3/2020 | Tuli et al. | |
| 10,609,434 B2 | 3/2020 | Singhai et al. | |
| 10,614,344 B2 | 4/2020 | Anthony et al. | |
| 10,621,513 B2 | 4/2020 | Deshpande et al. | |
| 10,627,818 B2 | 4/2020 | Sapp et al. | |
| 10,628,432 B2 | 4/2020 | Guo et al. | |
| 10,628,686 B2 | 4/2020 | Ogale et al. | |
| 10,628,688 B1 | 4/2020 | Kim et al. | |
| 10,629,080 B2 | 4/2020 | Kazemi et al. | |
| 10,636,161 B2 | 4/2020 | Uchigaito | |
| 10,636,169 B2 | 4/2020 | Estrada et al. | |
| 10,642,275 B2 | 5/2020 | Silva et al. | |
| 10,645,344 B2 | 5/2020 | Marman et al. | |
| 10,649,464 B2 | 5/2020 | Gray | |
| 10,650,071 B2 | 5/2020 | Asgekar et al. | |
| 10,652,565 B1 | 5/2020 | Zhang et al. | |
| 10,656,657 B2 | 5/2020 | Djuric et al. | |
| 10,657,391 B2 | 5/2020 | Chen et al. | |
| 10,657,418 B2 | 5/2020 | Marder et al. | |
| 10,657,934 B1 | 5/2020 | Kolen et al. | |
| 10,661,902 B1 | 5/2020 | Tavshikar | |
| 10,664,750 B2 | 5/2020 | Greene | |
| 10,671,082 B2 | 6/2020 | Huang et al. | |
| 10,671,886 B2 | 6/2020 | Price et al. | |
| 10,678,244 B2 | 6/2020 | Iandola et al. | |
| 10,678,839 B2 | 6/2020 | Gordon et al. | |
| 10,678,997 B2 | 6/2020 | Ahuja et al. | |
| 10,679,129 B2 | 6/2020 | Baker | |
| 10,685,159 B2 | 6/2020 | Su et al. | |
| 10,685,188 B1 | 6/2020 | Zhang et al. | |
| 10,692,000 B2 | 6/2020 | Surazhsky et al. | |
| 10,692,242 B1 | 6/2020 | Morrison et al. | |
| 10,693,740 B2 | 6/2020 | Coccia et al. | |
| 10,698,868 B2 | 6/2020 | Guggilla et al. | |
| 10,699,119 B2 | 6/2020 | Lo et al. | |
| 10,699,140 B2 | 6/2020 | Kench et al. | |
| 10,699,477 B2 | 6/2020 | Levinson et al. | |
| 10,713,502 B2 | 7/2020 | Tiziani | |
| 10,719,759 B2 | 7/2020 | Kutliroff | |
| 10,725,475 B2 | 7/2020 | Yang et al. | |
| 10,726,264 B2 | 7/2020 | Sawhney et al. | |
| 10,726,279 B1 | 7/2020 | Kim et al. | |

(56) References Cited

U.S. PATENT DOCUMENTS

| | | |
|---|---|---|
| 10,726,374 B1 | 7/2020 | Engineer et al. |
| 10,732,261 B1 | 8/2020 | Wang et al. |
| 10,733,262 B2 | 8/2020 | Miller et al. |
| 10,733,482 B1 | 8/2020 | Lee et al. |
| 10,733,638 B1 | 8/2020 | Jain et al. |
| 10,733,755 B2 | 8/2020 | Liao et al. |
| 10,733,876 B2 | 8/2020 | Moura et al. |
| 10,740,563 B2 | 8/2020 | Dugan |
| 10,740,914 B2 | 8/2020 | Xiao et al. |
| 10,748,062 B2 | 8/2020 | Rippel et al. |
| 10,748,247 B2 | 8/2020 | Paluri |
| 10,751,879 B2 | 8/2020 | Li et al. |
| 10,755,112 B2 | 8/2020 | Mabuchi |
| 10,755,575 B2 | 8/2020 | Johnston et al. |
| 10,757,330 B2 | 8/2020 | Ashrafi |
| 10,762,396 B2 | 9/2020 | Vailespi et al. |
| 10,768,628 B2 | 9/2020 | Martin et al. |
| 10,768,629 B2 | 9/2020 | Song et al. |
| 10,769,446 B2 | 9/2020 | Chang et al. |
| 10,769,483 B2 | 9/2020 | Nirenberg et al. |
| 10,769,493 B2 | 9/2020 | Yu et al. |
| 10,769,494 B2 | 9/2020 | Xiao et al. |
| 10,769,525 B2 | 9/2020 | Redding et al. |
| 10,776,626 B1 | 9/2020 | Lin et al. |
| 10,776,673 B2 | 9/2020 | Kim et al. |
| 10,776,939 B2 | 9/2020 | Ma et al. |
| 10,779,760 B2 | 9/2020 | Lee et al. |
| 10,783,381 B2 | 9/2020 | Yu et al. |
| 10,783,454 B2 | 9/2020 | Shoaib et al. |
| 10,789,402 B1 | 9/2020 | Vemuri et al. |
| 10,789,544 B2 | 9/2020 | Fiedel et al. |
| 10,790,919 B1 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 | 10/2020 | Bai et al. |
| 10,803,328 B1 | 10/2020 | Bai et al. |
| 10,803,743 B2 | 10/2020 | Abari et al. |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vallespi et al. |
| 10,817,732 B2 | 10/2020 | Porter et al. |
| 10,819,923 B1 | 10/2020 | McCauley et al. |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova et al. |
| 10,832,414 B2 | 11/2020 | Pfeiffer |
| 10,832,418 B1 | 11/2020 | Karasev et al. |
| 10,833,785 B1 | 11/2020 | O'Shea et al. |
| 10,836,379 B2 | 11/2020 | Xiao et al. |
| 10,838,936 B2 | 11/2020 | Cohen |
| 10,839,230 B2 | 11/2020 | Charette et al. |
| 10,839,578 B2 | 11/2020 | Coppersmith et al. |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar et al. |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,508 B2 | 1/2021 | Laszlo et al. |
| 10,902,551 B1 | 1/2021 | Mellado et al. |
| 10,908,068 B2 | 2/2021 | Amer et al. |
| 10,908,606 B2 | 2/2021 | Stein et al. |
| 10,909,368 B2 | 2/2021 | Guo et al. |
| 10,909,453 B1 | 2/2021 | Myers et al. |
| 10,915,783 B1 | 2/2021 | Hallman et al. |
| 10,917,522 B2 | 2/2021 | Segalis et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho et al. |
| 10,937,186 B2 | 3/2021 | Wang et al. |
| 10,943,101 B2 | 3/2021 | Agarwal et al. |
| 10,943,132 B2 | 3/2021 | Wang et al. |
| 10,943,355 B2 | 3/2021 | Fagg et al. |
| 10,956,755 B2 | 3/2021 | Musk et al. |
| 11,288,524 B2 | 3/2022 | Musk et al. |
| 2003/0035481 A1 | 2/2003 | Hahm |
| 2005/0162445 A1 | 7/2005 | Sheasby et al. |
| 2006/0072847 A1 | 4/2006 | Chor et al. |
| 2006/0224533 A1 | 10/2006 | Thaler |
| 2006/0280364 A1 | 12/2006 | Ma et al. |
| 2009/0016571 A1 | 1/2009 | Tijerina et al. |
| 2010/0118157 A1 | 5/2010 | Kameyama |
| 2012/0109915 A1 | 5/2012 | Kamekawa |
| 2012/0110491 A1 | 5/2012 | Cheung |
| 2012/0134595 A1 | 5/2012 | Fonseca et al. |
| 2014/0368493 A1* | 12/2014 | Rogan .................. G06T 11/60 345/419 |
| 2015/0104102 A1 | 4/2015 | Carreira et al. |
| 2016/0132786 A1 | 5/2016 | Balan et al. |
| 2016/0328856 A1 | 11/2016 | Mannino et al. |
| 2017/0011281 A1 | 1/2017 | Dijkman et al. |
| 2017/0039732 A1* | 2/2017 | Morifuji ................. G06F 3/013 |
| 2017/0158134 A1 | 6/2017 | Shigemura |
| 2017/0206434 A1 | 7/2017 | Nariyambut et al. |
| 2018/0012411 A1 | 1/2018 | Richey et al. |
| 2018/0018590 A1 | 1/2018 | Szeto et al. |
| 2018/0039853 A1 | 2/2018 | Liu et al. |
| 2018/0067489 A1 | 3/2018 | Oder et al. |
| 2018/0068459 A1 | 3/2018 | Zhang et al. |
| 2018/0068540 A1 | 3/2018 | Romanenko et al. |
| 2018/0074506 A1 | 3/2018 | Branson |
| 2018/0121762 A1 | 5/2018 | Han et al. |
| 2018/0150081 A1 | 5/2018 | Gross et al. |
| 2018/0211403 A1 | 7/2018 | Hotson et al. |
| 2018/0308012 A1 | 10/2018 | Mummadi et al. |
| 2018/0314878 A1 | 11/2018 | Lee et al. |
| 2018/0357511 A1 | 12/2018 | Misra et al. |
| 2018/0374105 A1 | 12/2018 | Azout et al. |
| 2019/0004534 A1* | 1/2019 | Huang .................. G01S 7/4808 |
| 2019/0023277 A1 | 1/2019 | Roger et al. |
| 2019/0025773 A1 | 1/2019 | Yang et al. |
| 2019/0042894 A1 | 2/2019 | Anderson |
| 2019/0042919 A1 | 2/2019 | Peysakhovich et al. |
| 2019/0042944 A1 | 2/2019 | Nair et al. |
| 2019/0042948 A1 | 2/2019 | Lee et al. |
| 2019/0057314 A1 | 2/2019 | Julian et al. |
| 2019/0065637 A1 | 2/2019 | Bogdoll et al. |
| 2019/0072978 A1 | 3/2019 | Levi |
| 2019/0079526 A1 | 3/2019 | Vallespi et al. |
| 2019/0080602 A1 | 3/2019 | Rice et al. |
| 2019/0095780 A1 | 3/2019 | Zhong et al. |
| 2019/0095946 A1 | 3/2019 | Azout et al. |
| 2019/0101914 A1 | 4/2019 | Coleman et al. |
| 2019/0108417 A1 | 4/2019 | Talagala et al. |

(56) References Cited

U.S. PATENT DOCUMENTS

| | | |
|---|---|---|
| 2019/0122111 A1 | 4/2019 | Min et al. |
| 2019/0130255 A1 | 5/2019 | Yim et al. |
| 2019/0145765 A1 | 5/2019 | Luo et al. |
| 2019/0146497 A1 | 5/2019 | Urtasun et al. |
| 2019/0147112 A1 | 5/2019 | Gordon |
| 2019/0147250 A1 | 5/2019 | Zhang et al. |
| 2019/0147254 A1 | 5/2019 | Bai et al. |
| 2019/0147255 A1 | 5/2019 | Homayounfar et al. |
| 2019/0147335 A1 | 5/2019 | Wang et al. |
| 2019/0147372 A1 | 5/2019 | Luo et al. |
| 2019/0158784 A1 | 5/2019 | Ahn et al. |
| 2019/0180154 A1 | 6/2019 | Orlov et al. |
| 2019/0185010 A1 | 6/2019 | Ganguli et al. |
| 2019/0189251 A1 | 6/2019 | Horiuchi et al. |
| 2019/0197357 A1 | 6/2019 | Anderson et al. |
| 2019/0204842 A1 | 7/2019 | Jafari et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |
| 2019/0235499 A1 | 8/2019 | Kazemi et al. |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzadeh et al. |
| 2019/0250640 A1 | 8/2019 | O'Flaherty et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0272446 A1 | 9/2019 | Kangaspunta et al. |
| 2019/0276041 A1 | 9/2019 | Choi et al. |
| 2019/0279004 A1 | 9/2019 | Kwon et al. |
| 2019/0286652 A1 | 9/2019 | Habbecke et al. |
| 2019/0286972 A1 | 9/2019 | El Husseini et al. |
| 2019/0287028 A1 | 9/2019 | St Amant et al. |
| 2019/0289281 A1 | 9/2019 | Badrinarayanan et al. |
| 2019/0294177 A1 | 9/2019 | Kwon et al. |
| 2019/0294975 A1 | 9/2019 | Sachs |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0329790 A1 | 10/2019 | Nandakumar et al. |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1 | 11/2019 | Lee et al. |
| 2019/0354808 A1 | 11/2019 | Park et al. |
| 2019/0354817 A1 | 11/2019 | Shiens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos et al. |
| 2019/0378049 A1 | 12/2019 | Widmann et al. |
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |
| 2019/0385360 A1 | 12/2019 | Yang et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao |
| 2020/0033865 A1 | 1/2020 | Mellinger, III et al. |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu et al. |
| 2020/0051550 A1 | 2/2020 | Baker |
| 2020/0060757 A1 | 2/2020 | Ben-Haim et al. |
| 2020/0065711 A1 | 2/2020 | Clément et al. |
| 2020/0065879 A1 | 2/2020 | Hu et al. |
| 2020/0069973 A1 | 3/2020 | Lou et al. |
| 2020/0073385 A1 | 3/2020 | Jobanputra et al. |
| 2020/0074230 A1 | 3/2020 | Englard et al. |
| 2020/0086880 A1 | 3/2020 | Poeppel et al. |
| 2020/0089243 A1 | 3/2020 | Poeppel et al. |
| 2020/0089969 A1 | 3/2020 | Lakshmi et al. |
| 2020/0090056 A1 | 3/2020 | Singhal et al. |
| 2020/0097841 A1 | 3/2020 | Petousis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Celia et al. |
| 2020/0117889 A1 | 4/2020 | Laput et al. |
| 2020/0117916 A1 | 4/2020 | Liu |
| 2020/0117917 A1 | 4/2020 | Yoo |
| 2020/0118035 A1 | 4/2020 | Asawa et al. |
| 2020/0125844 A1 | 4/2020 | She et al. |
| 2020/0125845 A1 | 4/2020 | Hess et al. |
| 2020/0126129 A1 | 4/2020 | Lkhamsuren et al. |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |
| 2020/0149898 A1 | 5/2020 | Felip et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo et al. |
| 2020/0159225 A1 | 5/2020 | Zeng et al. |
| 2020/0160064 A1 | 5/2020 | Wang et al. |
| 2020/0160104 A1 | 5/2020 | Urtasun et al. |
| 2020/0160117 A1 | 5/2020 | Urtasun et al. |
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | ReMine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |

(56) References Cited

U.S. PATENT DOCUMENTS

| | | |
|---|---|---|
| 2020/0202196 A1 | 6/2020 | Guo et al. |
| 2020/0209857 A1 | 7/2020 | Djuric et al. |
| 2020/0209867 A1 | 7/2020 | Valois |
| 2020/0209874 A1 | 7/2020 | Chen et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0216064 A1 | 7/2020 | du Toit et al. |
| 2020/0218722 A1 | 7/2020 | Mai et al. |
| 2020/0218979 A1 | 7/2020 | Kwon et al. |
| 2020/0223434 A1 | 7/2020 | Campos et al. |
| 2020/0225758 A1 | 7/2020 | Tang et al. |
| 2020/0226377 A1 | 7/2020 | Campos et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242511 A1 | 7/2020 | Kale et al. |
| 2020/0245869 A1 | 8/2020 | Sivan et al. |
| 2020/0249685 A1 | 8/2020 | Elluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser et al. |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov et al. |
| 2020/0315708 A1 | 10/2020 | Mosnier et al. |
| 2020/0320132 A1 | 10/2020 | Neumann |
| 2020/0324073 A1 | 10/2020 | Rajan et al. |
| 2020/0327192 A1 | 10/2020 | Hackman et al. |
| 2020/0327443 A1 | 10/2020 | Van et al. |
| 2020/0327449 A1 | 10/2020 | Tiwari et al. |
| 2020/0327662 A1 | 10/2020 | Liu et al. |
| 2020/0327667 A1 | 10/2020 | Arbel et al. |
| 2020/0331476 A1 | 10/2020 | Chen et al. |
| 2020/0334416 A1 | 10/2020 | Vianu et al. |
| 2020/0334495 A1 | 10/2020 | Al et al. |
| 2020/0334501 A1 | 10/2020 | Lin et al. |
| 2020/0334551 A1 | 10/2020 | Javidi et al. |
| 2020/0334574 A1 | 10/2020 | Ishida |
| 2020/0337648 A1 | 10/2020 | Saripalli et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk et al. |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano et al. |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | McGavran et al. |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0049378 A1 | 2/2021 | Gautam et al. |
| 2021/0049455 A1 | 2/2021 | Kursun |
| 2021/0049456 A1 | 2/2021 | Kursun |
| 2021/0049548 A1 | 2/2021 | Grisz et al. |
| 2021/0049700 A1 | 2/2021 | Nguyen et al. |
| 2021/0056114 A1 | 2/2021 | Price et al. |
| 2021/0056306 A1 | 2/2021 | Hu et al. |
| 2021/0056317 A1 | 2/2021 | Golov |
| 2021/0056420 A1 | 2/2021 | Konishi et al. |
| 2021/0056701 A1 | 2/2021 | Vranceanu et al. |

FOREIGN PATENT DOCUMENTS

| | | |
|---|---|---|
| CN | 110599537 A | 12/2010 |
| CN | 102737236 A | 10/2012 |
| CN | 103366339 A | 10/2013 |
| CN | 104835114 A | 8/2015 |
| CN | 103236037 B | 5/2016 |
| CN | 103500322 B | 8/2016 |
| CN | 106419893 A | 2/2017 |
| CN | 106504253 A | 3/2017 |
| CN | 107031600 A | 8/2017 |

(56) References Cited

FOREIGN PATENT DOCUMENTS

| | | | |
|---|---|---|---|
| CN | 107169421 | A | 9/2017 |
| CN | 107507134 | A | 12/2017 |
| CN | 107885214 | A | 4/2018 |
| CN | 108122234 | A | 6/2018 |
| CN | 107133943 | B | 7/2018 |
| CN | 107368926 | B | 7/2018 |
| CN | 105318888 | B | 8/2018 |
| CN | 108491889 | A | 9/2018 |
| CN | 108647591 | A | 10/2018 |
| CN | 108710865 | A | 10/2018 |
| CN | 105550701 | B | 11/2018 |
| CN | 108764185 | A | 11/2018 |
| CN | 108845574 | A | 11/2018 |
| CN | 108898177 | A | 11/2018 |
| CN | 109086867 | A | 12/2018 |
| CN | 107103113 | B | 1/2019 |
| CN | 109116374 | | 1/2019 |
| CN | 109215067 | A | 1/2019 |
| CN | 109359731 | A | 2/2019 |
| CN | 109389207 | A | 2/2019 |
| CN | 109389552 | A | 2/2019 |
| CN | 109579856 | A | 2/2019 |
| CN | 106779060 | B | 3/2019 |
| CN | 109615073 | A | 4/2019 |
| CN | 106156754 | B | 5/2019 |
| CN | 106598226 | B | 5/2019 |
| CN | 109791626 | A | 5/2019 |
| CN | 1066509228 | | 5/2019 |
| CN | 109901595 | A | 6/2019 |
| CN | 109902732 | A | 6/2019 |
| CN | 109934163 | A | 6/2019 |
| CN | 109948428 | A | 6/2019 |
| CN | 109949257 | A | 6/2019 |
| CN | 109951710 | A | 6/2019 |
| CN | 109975308 | A | 7/2019 |
| CN | 109978132 | A | 7/2019 |
| CN | 109978161 | A | 7/2019 |
| CN | 110060202 | A | 7/2019 |
| CN | 110069071 | A | 7/2019 |
| CN | 110084086 | A | 8/2019 |
| CN | 110096937 | A | 8/2019 |
| CN | 110111340 | A | 8/2019 |
| CN | 110135485 | A | 8/2019 |
| CN | 110197270 | B | 9/2019 |
| CN | 110310264 | A | 10/2019 |
| CN | 110321965 | A | 10/2019 |
| CN | 110334801 | A | 10/2019 |
| CN | 110399875 | A | 11/2019 |
| CN | 110414362 | A | 11/2019 |
| CN | 110426051 | A | 11/2019 |
| CN | 110473173 | A | 11/2019 |
| CN | 110516665 | A | 11/2019 |
| CN | 110543837 | A | 12/2019 |
| CN | 110569899 | A | 12/2019 |
| CN | 110599864 | A | 12/2019 |
| CN | 110619282 | A | 12/2019 |
| CN | 110619283 | A | 12/2019 |
| CN | 110619330 | A | 12/2019 |
| CN | 110659628 | A | 12/2019 |
| CN | 110688992 | A | 1/2020 |
| CN | 107742311 | B | 2/2020 |
| CN | 110751280 | A | 2/2020 |
| CN | 110826566 | A | 2/2020 |
| CN | 107451659 | B | 4/2020 |
| CN | 108111873 | B | 4/2020 |
| CN | 110956185 | A | 4/2020 |
| CN | 110966991 | A | 4/2020 |
| CN | 111027549 | A | 4/2020 |
| CN | 111027575 | A | 4/2020 |
| CN | 111047225 | A | 4/2020 |
| CN | 111126453 | A | 5/2020 |
| CN | 111158355 | A | 5/2020 |
| CN | 107729998 | B | 6/2020 |
| CN | 108549934 | B | 6/2020 |
| CN | 111275129 | A | 6/2020 |
| CN | 111275618 | A | 6/2020 |
| CN | 111326023 | A | 6/2020 |
| CN | 111428943 | A | 7/2020 |
| CN | 111444821 | A | 7/2020 |
| CN | 111445420 | A | 7/2020 |
| CN | 111461052 | A | 7/2020 |
| CN | 111461053 | A | 7/2020 |
| CN | 111461110 | A | 7/2020 |
| CN | 110225341 | B | 8/2020 |
| CN | 111307162 | B | 8/2020 |
| CN | 111488770 | A | 8/2020 |
| CN | 111539514 | A | 8/2020 |
| CN | 111565318 | A | 8/2020 |
| CN | 111582216 | A | 8/2020 |
| CN | 111598095 | A | 8/2020 |
| CN | 108229526 | B | 9/2020 |
| CN | 111693972 | A | 9/2020 |
| CN | 106558058 | B | 10/2020 |
| CN | 107169560 | B | 10/2020 |
| CN | 107622258 | B | 10/2020 |
| CN | 111767801 | A | 10/2020 |
| CN | 111768002 | A | 10/2020 |
| CN | 111783545 | A | 10/2020 |
| CN | 111783971 | A | 10/2020 |
| CN | 111797657 | A | 10/2020 |
| CN | 111814623 | A | 10/2020 |
| CN | 111814902 | A | 10/2020 |
| CN | 111860499 | A | 10/2020 |
| CN | 111881856 | A | 11/2020 |
| CN | 111882579 | A | 11/2020 |
| CN | 111897639 | A | 11/2020 |
| CN | 111898507 | A | 11/2020 |
| CN | 111898523 | A | 11/2020 |
| CN | 111899227 | A | 11/2020 |
| CN | 112101175 | A | 12/2020 |
| CN | 112101562 | A | 12/2020 |
| CN | 112115953 | A | 12/2020 |
| CN | 111062973 | B | 1/2021 |
| CN | 111275080 | B | 1/2021 |
| CN | 112183739 | A | 1/2021 |
| CN | 112232497 | A | 1/2021 |
| CN | 112288658 | A | 1/2021 |
| CN | 112308095 | A | 2/2021 |
| CN | 112308799 | A | 2/2021 |
| CN | 112313663 | A | 2/2021 |
| CN | 112329552 | A | 2/2021 |
| CN | 112348783 | A | 2/2021 |
| CN | 111899245 | B | 3/2021 |
| DE | 202017102235 | U1 | 5/2017 |
| DE | 202017102238 | U1 | 5/2017 |
| DE | 102017116017 | A1 | 1/2019 |
| DE | 102018130821 | A1 | 6/2020 |
| DE | 102019008316 | A1 | 8/2020 |
| EP | 1215626 | B1 | 9/2008 |
| EP | 2228666 | B1 | 9/2012 |
| EP | 2420408 | B1 | 5/2013 |
| EP | 2723069 | A1 | 4/2014 |
| EP | 2741253 | A1 | 6/2014 |
| EP | 3115772 | A1 | 1/2017 |
| EP | 2618559 | B1 | 8/2017 |
| EP | 3285485 | A1 | 2/2018 |
| EP | 3 438 872 | | 2/2019 |
| EP | 2863633 | B1 | 2/2019 |
| EP | 3113080 | B1 | 5/2019 |
| EP | 3525132 | A1 | 8/2019 |
| EP | 3531689 | A1 | 8/2019 |
| EP | 3537340 | A1 | 9/2019 |
| EP | 3543917 | A1 | 9/2019 |
| EP | 3608840 | A1 | 2/2020 |
| EP | 3657387 | A1 | 5/2020 |
| EP | 2396750 | B1 | 6/2020 |
| EP | 3664020 | A1 | 6/2020 |
| EP | 3690712 | A1 | 8/2020 |
| EP | 3690742 | A1 | 8/2020 |
| EP | 3722992 | A1 | 10/2020 |
| EP | 3690730 | A2 | 11/2020 |
| EP | 3739486 | A1 | 11/2020 |
| EP | 3501897 | B1 | 12/2020 |
| EP | 3751455 | A2 | 12/2020 |

(56) References Cited

FOREIGN PATENT DOCUMENTS

| | | |
|---|---|---|
| EP | 3783527 A1 | 2/2021 |
| GB | 2402572 B | 8/2005 |
| GB | 2548087 A | 9/2017 |
| GB | 2577485 A | 4/2020 |
| GB | 2517270 B | 6/2020 |
| JP | 2578262 Y2 | 8/1998 |
| JP | 3941252 B2 | 7/2007 |
| JP | 4282583 B2 | 6/2009 |
| JP | 4300098 B2 | 7/2009 |
| JP | 2010-083312 | 4/2010 |
| JP | 2015004922 A | 1/2015 |
| JP | 5863536 B2 | 2/2016 |
| JP | 6044134 B2 | 12/2016 |
| JP | 2017-207874 | 11/2017 |
| JP | 2018-072105 | 5/2018 |
| JP | 2018-097648 | 6/2018 |
| JP | 2019-008460 | 1/2019 |
| JP | 6525707 B2 | 6/2019 |
| JP | 2019101535 A | 6/2019 |
| JP | 2020101927 A | 7/2020 |
| JP | 2020173744 A | 10/2020 |
| KR | 100326702 B1 | 2/2002 |
| KR | 101082878 B1 | 11/2011 |
| KR | 101738422 B1 | 5/2017 |
| KR | 101969864 B1 | 4/2019 |
| KR | 101996167 B1 | 7/2019 |
| KR | 102022388 B1 | 8/2019 |
| KR | 102043143 B1 | 11/2019 |
| KR | 102095335 B1 | 3/2020 |
| KR | 102097120 B1 | 4/2020 |
| KR | 1020200085490 A | 7/2020 |
| KR | 102189262 B1 | 12/2020 |
| KR | 1020200142266 A | 12/2020 |
| TW | 200630819 A | 9/2006 |
| TW | I294089 B | 3/2008 |
| TW | I306207 B | 2/2009 |
| WO | WO 02/052835 | 7/2002 |
| WO | WO 16/032398 | 3/2016 |
| WO | WO 16/048108 | 3/2016 |
| WO | WO 16/207875 | 12/2016 |
| WO | WO 17/158622 | 9/2017 |
| WO | WO 19/005547 | 1/2019 |
| WO | WO 19/012534 | 1/2019 |
| WO | WO 19/067695 | 4/2019 |
| WO | WO 19/089339 | 5/2019 |
| WO | WO 19/092456 | 5/2019 |
| WO | WO 19/099622 | 5/2019 |
| WO | WO 19/122952 | 6/2019 |
| WO | WO 19/125191 | 6/2019 |
| WO | WO 19/126755 | 6/2019 |
| WO | WO 19/144575 | 8/2019 |
| WO | WO 19/182782 | 9/2019 |
| WO | WO 19/191578 | 10/2019 |
| WO | WO 19/216938 | 11/2019 |
| WO | WO 19/220436 | 11/2019 |
| WO | WO 20/006154 | 1/2020 |
| WO | WO 20/012756 | 1/2020 |
| WO | WO 20/025696 | 2/2020 |
| WO | WO 20/034663 | 2/2020 |
| WO | WO 20/056157 | 3/2020 |
| WO | WO 20/076356 | 4/2020 |
| WO | WO 20/097221 | 5/2020 |
| WO | WO 20/101246 | 5/2020 |
| WO | WO 20/120050 | 6/2020 |
| WO | WO 20/121973 | 6/2020 |
| WO | WO 20/131140 | 6/2020 |
| WO | WO 20/139181 | 7/2020 |
| WO | WO 20/139355 | 7/2020 |
| WO | WO 20/139357 | 7/2020 |
| WO | WO 20/142193 | 7/2020 |
| WO | WO 20/146445 | 7/2020 |
| WO | WO 20/151329 | 7/2020 |
| WO | WO 20/157761 | 8/2020 |
| WO | WO 20/163455 | 8/2020 |
| WO | WO 20/167667 | 8/2020 |
| WO | WO 20/174262 | 9/2020 |
| WO | WO 20/177583 | 9/2020 |
| WO | WO 20/185233 | 9/2020 |
| WO | WO 20/185234 | 9/2020 |
| WO | WO 20/195658 | 10/2020 |
| WO | WO 20/198189 | 10/2020 |
| WO | WO 20/198779 | 10/2020 |
| WO | WO 20/205597 | 10/2020 |
| WO | WO 20/221200 | 11/2020 |
| WO | WO 20/240284 | 12/2020 |
| WO | WO 20/260020 | 12/2020 |
| WO | WO 20/264010 | 12/2020 |

\* cited by examiner

ESTIMATING OBJECT PROPERTIES USING VISUAL IMAGE DATA

BACKGROUND OF THE INVENTION

Autonomous driving systems typically rely on mounting numerous sensors including a collection of vision and emitting distance sensors (e.g., radar sensor, lidar sensor, ultrasonic sensor, etc.) on a vehicle. The data captured by each sensor is then gathered to help understand the vehicle's surrounding environment and to determine how to control the vehicle. Vision sensors can be used to identify objects from captured image data and emitting distance sensors can be used to determine the distance of the detected objects. Steering and speed adjustments can be applied based on detected obstacles and clear drivable paths. But as the number and types of sensors increases, so does the complexity and cost of the system. For example, emitting distance sensors such as lidar are often costly to include in a mass market vehicle. Moreover, each additional sensor increases the input bandwidth requirements for the autonomous driving system. Therefore, there exists a need to find the optimal configuration of sensors on a vehicle. The configuration should limit the total number of sensors without limiting the amount and type of data captured to accurately describe the surrounding environment and safely control the vehicle.

BRIEF DESCRIPTION OF THE DRAWINGS

Various embodiments of the invention are disclosed in the following detailed description and the accompanying drawings.

DETAILED DESCRIPTION

Figure 1:
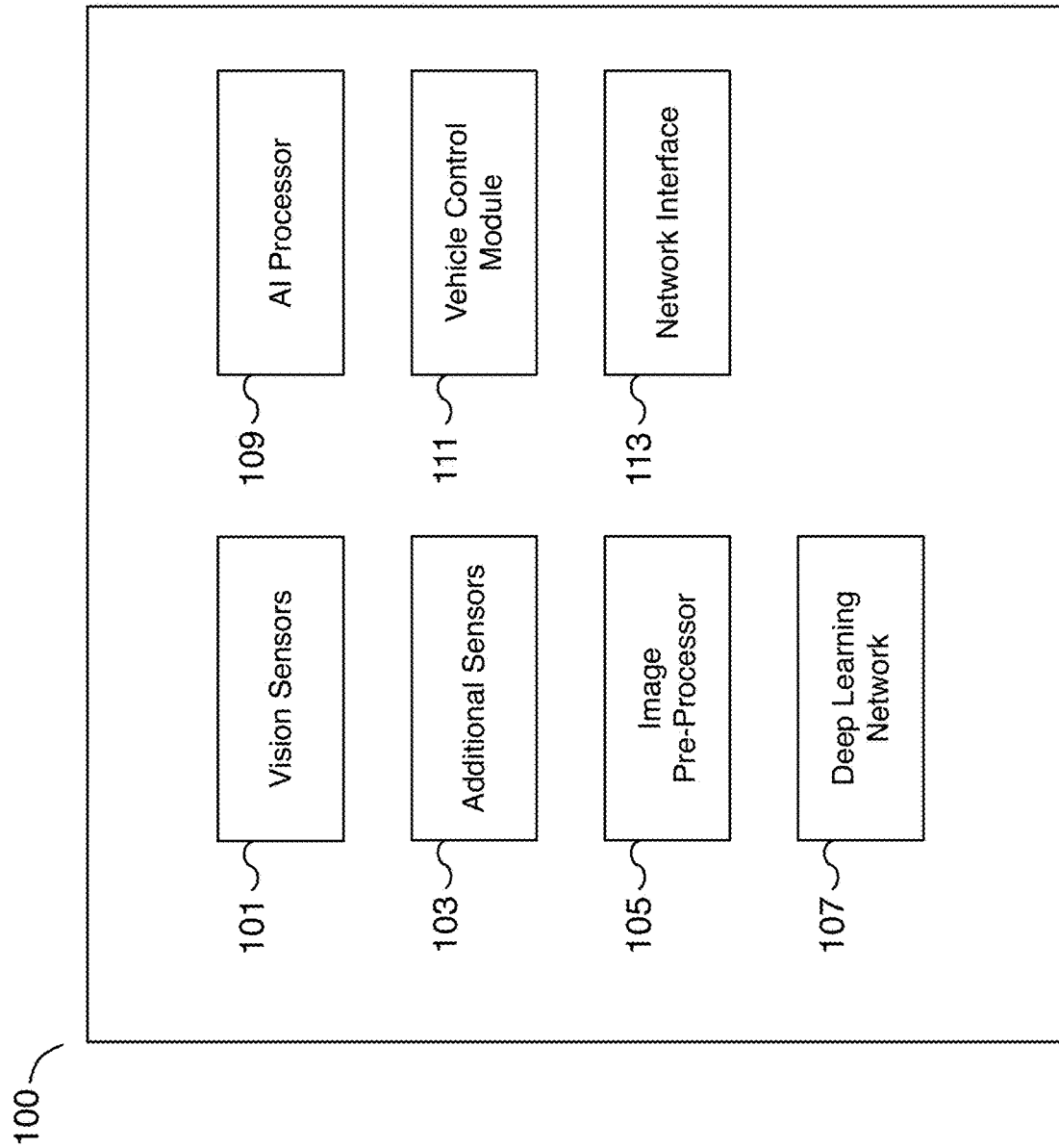
FIG. 1 is a block diagram illustrating an embodiment of a deep learning system for autonomous driving.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided is below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A machine learning training technique for generating highly accurate machine learning results from vision data is disclosed. Using auxiliary sensor data, such as radar and lidar results, the auxiliary data is associated with objects identified from the vision data to accurately estimate object properties such as object distance. In various embodiments, the collection and association of auxiliary data with vision data is done automatically and requires little, if any, human intervention. For example, objects identified using vision techniques do not need to be manually labeled, significantly improving the efficiency of machine learning training. Instead, the training data can be automatically generated and used to train a machine learning model to predict object properties with a high degree of accuracy. For example, the data may be collected automatically from a fleet of vehicles by collecting snapshots of the vision data and associated related data, such as radar data. In some embodiments, only a subset of the vision-radar related association targets are sampled. The collected fusion data from the fleet of vehicles is automatically collected and used to train neural nets to mimic the captured data. The trained machine learning model can be deployed to vehicles for accurately predicting object properties, such as distance, direction, and velocity, using only vision data. For example, once the machine learning model has been trained to be able to determine an object distance using images of a camera without a need of a dedicated distance sensor, it may become no longer necessary to include a dedicated distance sensor in an autonomous driving vehicle. When used in conjunction with a dedicated distance sensor, this machine learning model can be used as a redundant or a secondary distance data source to improve accuracy and/or provide fault tolerance. The identified objects and corresponding properties can be used to implement autonomous driving features such as self-driving or driver-assisted operation of a vehicle. For example, an autonomous vehicle can be controlled to avoid a merging vehicle identified using the disclosed techniques.

A system comprising one or more processors coupled to memory is configured to receive image data based on an image captured using a camera of a vehicle. For example, a processor such as an artificial intelligence (AI) processor installed on an autonomous vehicle receives image data from a camera, such as a forward-facing camera of the vehicle. Additional cameras such as side-facing and rear-facing cameras can be used as well. The image data is utilized as a basis of an input to a machine learning trained model to at least in part identify a distance of an object from the vehicle. For example, the captured image is used as an input to a machine learning model such as a model of a deep learning network running on the AI processor. The model is used to predict the distance of objects identified in the image data. Surrounding objects such as vehicles and pedestrians can be identified from the image data and the accuracy and direction are inferred using a deep learning system. In various embodiments, the trained machine learning model has been trained using a training image and a correlated output of an emitting distance sensor. Emitting distance sensors may emit a signal (e.g., radio signal, ultrasonic signal, light signal, etc.) in detecting a distance of an object from the sensor. For example, a radar sensor mounted to a vehicle emits radar to identify the distance and direction of surrounding obstacles. The distances are then correlated to objects identified in a training image captured from the vehicle's camera. The associated training image is annotated with the distance measurements and used to train a machine learning model. In some embodiments, the model is used to predict additional properties such as an object's velocity. For example, the velocity of objects determined by radar is associated with objects in the training image to train a machine learning model to predict object velocities and directions.

In some embodiments, a vehicle is equipped with sensors to capture the environment of the vehicle and vehicle operating parameters. The captured data includes vision data (such as video and/or still images) and additional auxiliary data such as radar, lidar, inertia, audio, odometry, location, and/or other forms of sensor data. For example, the sensor data may capture vehicles, pedestrians, vehicle lane lines, vehicle traffic, obstacles, traffic control signs, traffic sounds, etc. Odometry and other similar sensors capture vehicle operating parameters such as vehicle speed, steering, orientation, change in direction, change in location, change in elevation, change in speed, etc. The captured vision and auxiliary data is transmitted from the vehicle to a training server for creating a training data set. In some embodiments, the transmitted vision and auxiliary data is correlated and used to automatically generate training data. The training data is used to train a machine learning model for generating highly accurate machine learning results. In some embodiments, a time series of captured data is used to generate the training data. A ground truth is determined based on a group of time series elements and is used to annotate at least one of the elements, such as a single image, from the group. For example, a series of images and radar data for a time period, such as 30 seconds, are captured. A vehicle identified from the image data and tracked across the time series is associated with a corresponding radar distance and direction from the time series. The associated auxiliary data, such as radar distance data, is associated with the vehicle after analyzing the image and distance data captured for the time series. By analyzing the image and auxiliary data across the time series, ambiguities such as multiple objects with similar distances can be resolved with a high degree of accuracy to determine a ground truth. For example, when using only a single captured image, there may be insufficient corresponding radar data to accurately estimate the different distances of two cars in the event one car occludes another or when two cars are close together. By tracking the cars over a time series, however, the distances identified by radar can be properly associated with the correct cars as the cars separate, travel in different directions, and/or travel at different speeds, etc. In various embodiments, once the auxiliary data is properly associated with an object, one or more images of the time series are converted to training images and annotated with the corresponding ground truth such as the distance, velocity, and/or other appropriate object properties.

In various embodiments, a machine learning model trained using auxiliary sensor data can accurately predict the result of an auxiliary sensor without the need for the physical auxiliary sensor. For example, training vehicles can be equipped with auxiliary sensors, including expensive and/or difficult to operate sensors, for collecting training data. The training data can then be used to train a machine learning model for predicting the result of an auxiliary sensor, such as a radar, lidar, or another sensor. The trained model is then deployed to vehicles, such as production vehicles, that only require vision sensors. The auxiliary sensors are not required but can be used as a secondary data source. There are many advantages to reducing the number of sensors including the difficulty in re-calibrating sensors, maintenance of the sensors, the cost of additional sensors, and/or additional bandwidth and computational requirements for additional sensors, among others. In some embodiments, the trained model is used in the case of auxiliary sensors failing. Instead of relying on additional auxiliary sensors, the trained machine learning model uses input from one or more vision sensors to predict the result of the auxiliary sensors. The predicted results can be used for implementing autonomous driving features that require detecting objects (e.g., pedestrians, stationary vehicles, moving vehicles, curbs, obstacles, road barriers, etc.) and their distance and direction. The predicted results can be used to detect the distance and direction of traffic control objects such as traffic lights, traffic signs, street signs, etc. Although vision sensors and object distance are used in the previous examples, alternative sensors and predicted properties are possible as well.

FIG. 1 is a block diagram illustrating an embodiment of a deep learning system for autonomous driving. The deep learning system includes different components that may be used together for self-driving and/or driver-assisted operation of a vehicle as well as for gathering and processing data for training a machine learning model. In various embodiments, the deep learning system is installed on a vehicle and data captured from the vehicle can be used to train and improve the deep learning system of the vehicle or other similar vehicles. The deep learning system may be used to implement autonomous driving functionality including identifying objects and predicting object properties such as distance and direction using vision data as input.

In the example shown, deep learning system 100 is a deep learning network that includes vision sensors 101, additional sensors 103, image pre-processor 105, deep learning network 107, artificial intelligence (AI) processor 109, vehicle control module 111, and network interface 113. In various embodiments, the different components are communicatively connected. For example, image data captured from vision sensors 101 is fed to image pre-y) processor 105. Processed sensor data of image pre-processor 105 is fed to deep learning network 107 running on AI processor 109. In some embodiments, sensor data from additional sensors 103 is used as an input to deep learning network 107. The output of deep learning network 107 running on AI processor 109 is fed to vehicle control module 111. In various embodiments, vehicle control module 111 is connected to and controls the operation of the vehicle such as the is speed, braking, and/or steering, etc. of the vehicle. In various embodiments, sensor data and/or machine learning results can be sent to a remote server (not shown) via network interface 113. For example, sensor data, such as data captured from vision sensors 101 and/or additional sensors 103, can be transmitted to a remote training server via network interface 113 to collect training data for improving the performance, comfort, and/or safety of the vehicle. In various embodiments, network interface 113 is used to communicate with remote servers, to make phone calls, to send and/or receive text messages, and to transmit sensor data based on the operation of the vehicle, among other reasons. In some embodiments, deep learning system 100 may include additional or fewer components as appropriate. For example, in some embodiments, image pre-processor 105 is an optional component. As another example, in some embodiments, a post-processing component (not shown) is used to perform post-processing on the output of deep learning network 107 before the output is provided to vehicle control module 111.

In some embodiments, vision sensors 101 include one or more camera sensors for capturing image data. In various embodiments, vision sensors 101 may be affixed to a vehicle, at different locations of the vehicle, and/or oriented in one or more different directions. For example, vision sensors 101 may be affixed to the front, sides, rear, and/or roof, etc. of the vehicle in forward-facing, rear-facing, side-facing, etc. directions. In some embodiments, vision sensors 101 may be image sensors such as high dynamic range cameras and/or cameras with different fields of view. For example, in some embodiments, eight surround cameras are affixed to a vehicle and provide 360 degrees of visibility around the vehicle with a range of up to 250 meters. In some embodiments, camera sensors include a wide forward camera, a narrow forward camera, a rear view camera, forward looking side cameras, and/or rearward looking side cameras.

In some embodiments, vision sensors 101 are not mounted to the vehicle with vehicle control module 111. For example, vision sensors 101 may be mounted on neighboring vehicles and/or affixed to the road or environment and are included as part of a deep learning system for capturing sensor data. In various embodiments, vision sensors 101 include one or more cameras that capture the surrounding environment of the vehicle, including the road the vehicle is traveling on. For example, one or more front-facing and/or pillar cameras capture images of objects such as vehicles, pedestrians, traffic control objects, roads, curbs, obstacles, is etc. in the environment surrounding the vehicle. As another example, cameras capture a time series of image data including image data of neighboring vehicles including those attempting to cut into the lane the vehicle is traveling in. Vision sensors 101 may include image sensors capable of capturing still images and/or video. The data may be captured over a period of time, such as a sequence of captured data over a period of time, and synchronized with other vehicle data including other sensor data. For example, image data used to identify objects may be captured along with radar and odometry data over a period of 15 seconds or another appropriate period.

In some embodiments, additional sensors 103 include additional sensors for capturing sensor data in addition to vision sensors 101. In various embodiments, additional sensors 103 may be affixed to a vehicle, at different locations of the vehicle, and/or oriented in one or more different directions. For example, additional sensors 103 may be affixed to the front, sides, rear, and/or roof, etc. of the vehicle in forward-facing, rear-facing, side-facing, etc. directions. In some embodiments, additional sensors 103 may be emitting sensors such as radar, ultrasonic, and/or lidar sensors. In some embodiments, additional sensors 103 include non-visual sensors. Additional sensors 103 may include radar, audio, lidar, inertia, odometry, location, and/or ultrasonic sensors, among others. For example, twelve ultrasonic sensors may be affixed to the vehicle to detect both hard and soft objects. In some embodiments, a forward-facing radar is utilized to capture data of the surrounding environment. In various embodiments, radar sensors are able to capture surrounding detail despite heavy rain, fog, dust, and other vehicles.

In some embodiments, additional sensors 103 are not mounted to the vehicle with vehicle control module 111. For example, similar to vision sensors 101, additional sensors 103 may be mounted on neighboring vehicles and/or affixed to the road or environment and are included as part of a deep learning system for capturing sensor data. In some embodiments, additional sensors 103 include one or more sensors that capture the surrounding environment of the vehicle, including the road the vehicle is traveling on. For example, a forward-facing radar sensor captures the distance data of objects in the forward field of view of the vehicle. Additional sensors may capture odometry, location, and/or vehicle control information including information related to vehicle trajectory. Sensor data may be captured over a period of time, such as a sequence of captured data over a period of time, and associated with image data is captured from vision sensors 101. In some embodiments, additional sensors 103 include location sensors such as global position system (GPS) sensors for determining the vehicle's location and/or change in location. In various embodiments, one or more sensors of additional sensors 103 are optional and are included only on vehicles designed for capturing training data. Vehicles without one or more sensors of additional sensors 103 can simulate the results of additional sensors 103 by predicting the output using a trained machine learning model and the techniques disclosed herein. For example, vehicles without a forward-facing radar or lidar sensor can predict the results of the optional sensor using image data by applying a trained machine learning model, such as the model of deep learning network 107.

In some embodiments, image pre-processor 105 is used to pre-process sensor data of vision sensors 101. For example, image pre-processor 105 may be used to pre-process the sensor data, split sensor data into one or more components, and/or post-process the one or more components. In some embodiments, image pre-processor 105 is a graphics processing unit (GPU), a central processing unit (CPU), an image signal processor, or a specialized image processor. In various embodiments, image pre-processor 105 is a tone-mapper processor to process high dynamic range data. In some embodiments, image pre-processor 105 is implemented as part of artificial intelligence (AI) processor 109. For example, image pre-processor 105 may be a component of AI processor 109. In some embodiments, image pre-processor 105 may be used to normalize an image or to transform an image. For example, an image captured with a fisheye lens may be warped and image pre-processor 105 may be used to transform the image to remove or modify the warping. In some embodiments, noise, distortion, and/or blurriness is removed or reduced during a pre-processing step. In various embodiments, the image is adjusted or normalized to improve the result of machine learning analysis. For example, the white balance of the image is adjusted to account for different lighting operating conditions such as daylight, sunny, cloudy, dusk, sunrise, sunset, and night conditions, among others.

In some embodiments, deep learning network 107 is a deep learning network used for determining vehicle control parameters including analyzing the driving environment to determine objects and their corresponding properties such as distance, velocity, or another appropriate parameter. For example, deep learning network 107 may be an artificial neural is network such as a convolutional neural network (CNN) that is trained on input such as sensor data and its output is provided to vehicle control module 111. As one example, the output may include at least a distance estimate of detected objects. As another example, the output may include at least potential vehicles that are likely to merge into the vehicle's lane, their distances, and their velocities. In some embodiments, deep learning network 107 receives as input at least image sensor data, identifies objects in the image sensor data, and predicts the distance of the objects. Additional input may include scene data describing the environment around the vehicle and/or vehicle specifications such as operating characteristics of the vehicle. Scene data may include scene tags describing the environment around the vehicle, such as raining, wet roads, snowing, muddy, high density traffic, highway, urban, school zone, etc. In some embodiments, the output of deep learning network 107 is a three-dimensional representation of a vehicle's surrounding environment including cuboids representing objects such as identified objects. In some embodiments, the output of deep learning network 107 is used for autonomous driving including navigating a vehicle towards a target destination.

In some embodiments, artificial intelligence (AI) processor 109 is a hardware processor for running deep learning network 107. In some embodiments, AI processor 109 is a specialized AI processor for performing inference using a convolutional neural network (CNN) on sensor data. AI processor 109 may be optimized for the bit depth of the sensor data. In some embodiments, AI processor 109 is optimized for deep learning operations such as neural network operations including convolution, dot-product, vector, and/or matrix operations, among others. In some embodiments, AI processor 109 is implemented using a graphics processing unit (GPU).

In various embodiments, AI processor 109 is coupled to memory that is configured to provide the AI processor with instructions which when executed cause the AI processor to perform deep learning analysis on the received input sensor data and to determine a machine learning result, such as an object distance, used for autonomous driving. In some embodiments, AI processor 109 is used to process sensor data in preparation for making the data available as training data.

In some embodiments, vehicle control module 111 is utilized to process the output of artificial intelligence (AI) processor 109 and to translate the output into a vehicle control operation. In some embodiments, vehicle control module 111 is utilized to control the vehicle for autonomous driving. In various embodiments, vehicle control module 111 can adjust is speed, acceleration, steering, braking, etc. of the vehicle. For example, in some embodiments, vehicle control module 111 is used to control the vehicle to maintain the vehicle's position within a lane, to merge the vehicle into another lane, to adjust the vehicle's speed and lane positioning to account for merging vehicles, etc.

In some embodiments, vehicle control module 111 is used to control vehicle lighting such as brake lights, turns signals, headlights, etc. In some embodiments, vehicle control module 111 is used to control vehicle audio conditions such as the vehicle's sound system, playing audio alerts, enabling a microphone, enabling the horn, etc. In some embodiments, vehicle control module 111 is used to control notification systems including warning systems to inform the driver and/or passengers of driving events such as a potential collision or the approach of an intended destination. In some embodiments, vehicle control module 111 is used to adjust sensors such as vision sensors 101 and additional sensors 103 of a vehicle. For example, vehicle control module 111 may be used to change parameters of one or more sensors such as modifying the orientation, changing the output resolution and/or format type, increasing or decreasing the capture rate, adjusting the captured dynamic range, adjusting the focus of a camera, enabling and/or disabling a sensor, etc. In some embodiments, vehicle control module 111 may be used to change parameters of image pre-processor 105 such as modifying the frequency range of filters, adjusting feature and/or edge detection parameters, adjusting channels and bit depth, etc. In various embodiments, vehicle control module 111 is used to implement self-driving and/or driver-assisted control of a vehicle. In some embodiments, vehicle control module 111 is implemented using a processor coupled with memory. In some embodiments, vehicle control module 111 is implemented using an application-specific integrated circuit (ASIC), a programmable logic device (PLD), or other appropriate processing hardware.

In some embodiments, network interface 113 is a communication interface for sending and/or receiving data including training data. In various embodiments, a network interface 113 includes a cellular or wireless interface for interfacing with remote servers, to transmit sensor data, to transmit potential training data, to receive updates to the deep learning network including updated machine learning models, to connect and make voice calls, to send and/or receive text messages, etc. For example, network interface 113 may be used to transmit is sensor data captured for use as potential training data to a remote training server for training a machine learning model. As another example, network interface 113 may be used to receive an update for the instructions and/or operating parameters for vision sensors 101, additional sensors 103, image pre-processor 105, deep learning network 107, AI processor 109, and/or vehicle control module 111. A machine learning model of deep learning network 107 may be updated using network interface 113. As another example, network interface 113 may be used to update firmware of vision sensors 101 and additional sensors 103 and/or operating parameters of image pre-processor 105 such as image processing parameters.

Figure 2:
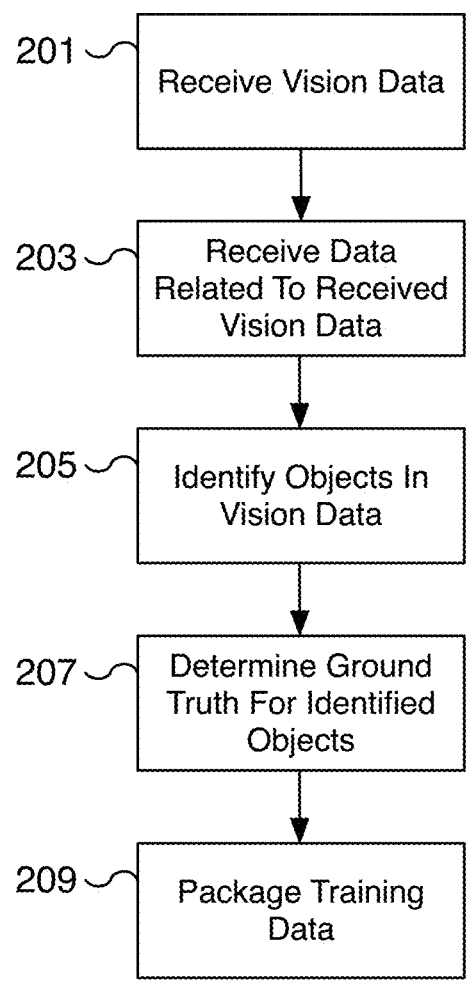
FIG. 2 is a flow diagram illustrating an embodiment of a process for creating training data for predicting object properties.

FIG. 2 is a flow diagram illustrating an embodiment of a process for creating training data for predicting object properties. For example, image data is annotated with sensor data from additional auxiliary sensors to automatically create training data. In some embodiments, a time series of elements made up of sensor and related auxiliary data is collected from a vehicle and used to automatically create training data. In various embodiments, the process of FIG. 2 is used to automatically label training data with corresponding ground truths. The ground truth and image data are packaged as training data to predict properties of objects identified from the image data. In various embodiments, the sensor and related auxiliary data are captured using the deep learning system of FIG. 1. For example, in various embodiments, the sensor data is captured from vision sensors 101 of FIG. 1 and related data is captured from additional sensors 103 of FIG. 1. In some embodiments, the process of FIG. 2 is performed to automatically collect data when existing predictions are incorrect or can be improved. For example, a prediction is made by an autonomous vehicle to determine one or more object properties, such as distance and direction, from vision data. The prediction is compared to distance data received from an emitting distance sensor. A determination can be made whether the prediction is within an acceptable accuracy threshold. In some embodiments, a determination is made that the prediction can be improved. In the event the prediction is not sufficiently accurate, the process of FIG. 2 can be applied to the prediction scenario to create a curated set of training examples for improving the machine learning model.

At 201, vision data is received. The vision data may be image data such as video and/or still images. In various embodiments, the vision data is captured at a vehicle and transmitted to a training server. The vision data may be captured over a period of time to create is a time series of elements. In various embodiments, the elements include timestamps to maintain an ordering of the elements. By capturing a time series of elements, objects in the time series can be tracked across the time series to better disambiguate objects that are difficult to identify from a single input sample, such as a single input image and corresponding related data. For example, a pair of oncoming headlights may appear at first to both belong to a single vehicle but in the event the headlights separate, each headlight is identified as belonging to a separate motorcycle. In some scenarios, objects in the image data are easier to distinguish than objects in the auxiliary related data received at 203. For example, it may be difficult to disambiguate using only distance data the estimated distance of a van from a wall that the van is alongside of. However, by tracking the van across a corresponding time series of image data, the correct distance data can be associated with the identified van. In various embodiments, sensor data captured as a time series is captured in the format that a machine learning model uses as input. For example, the sensor data may be raw or processed image data.

In various embodiments, in the event a time series of data is received, the time series may be organized by associating a timestamp with each element of the time series. For example, a timestamp is associated with at least the first element in a time series. The timestamp may be used to calibrate time series elements with related data such as data received at 203. In various embodiments, the length of the time series may be a fixed length of time, such as 10 seconds, 30 seconds, or another appropriate length. The length of time may be configurable. In various embodiments, the time series may be based on the speed of the vehicle, such as the average speed of the vehicle. For example, at slower speeds, the length of time for a time series may be increased to capture data over a longer distance traveled than would be possible if using a shorter time length for the same speed. In some embodiments, the number of elements in the time series is configurable. The number of elements may be based on the distance traveled. For example, for a fixed time period, a faster moving vehicle includes more elements in the time series than a slower moving vehicle. The additional elements increase the fidelity of the captured environment and can improve the accuracy of the predicted machine learning results. In various embodiments, the number of elements is adjusted by adjusting the frames per second a sensor captures data and/or by discarding unneeded intermediate frames.

At 203, data related to the received vision data is received. In various is embodiments, the related data is received at a training server along with the vision data received at 201. In some embodiments, the related data is sensor data from additional sensors of the vehicle, such as ultrasonic, radar, lidar, or other appropriate sensors. The related data may be distance, direction, velocity, location, orientation, change in location, change in orientation, and/or other related data captured by the vehicle's additional sensors. The related data may be used to determine a ground truth for features identified in the vision data received at 201. For example, distance and direction measurements from radar sensors are used to determine object distances and directions for objects identified in the vision data. In some embodiments, the related data received is a time series of data corresponding to a time series of vision data received at 201.

In some embodiments, the data related to the vision data includes map data. For example, offline data such as road and/or satellite level map data may be received at 203. The map data may be used to identify features such as roads, vehicle lanes, intersections, speed limits, school zones, etc. For example, the map data can describe the path of vehicle lanes. Using the estimated location of identified vehicles in vehicles lanes, estimated distances for the detected vehicles can be determined/corroborated. As another example, the map data can describe the speed limit associated with different roads of the map. In some embodiments, the speed limit data may be used to validate velocity vectors of identified vehicles.

At 205, objects in the vision data are identified. In some embodiments, the vision data is used as an input to identify objects in the surrounding environment of the vehicle. For example, vehicles, pedestrians, obstacles, etc. are identified from the vision data. In some embodiments, the objects are identified using a deep learning system with a trained machine learning model. In various embodiments, bounding boxes are created for identified objects. The bounding boxes may be two-dimensional bounding boxes or three-dimensional bounding boxes, such as cuboids, that outline the exterior of the identified object. In some embodiments, additional data is used to help identify the objects, such as the data received at 203. The additional data may be used to increase the accuracy in object identification.

At 207, a ground truth is determined for identified objects. Using the related data received at 203, ground truths are determined for the object identified at 205 from the vision data received at 201. In some embodiments, the related data is depth (and/or distance) data of the is identified objects. By associating the distance data with the identified objects, a machine learning model can be trained to estimate object distances by using the related distance data as the ground truth for detected objects. In some embodiments, the distances are for detected objects such as an obstacle, a barrier, a moving vehicle, a stationary vehicle, traffic control signals, pedestrians, etc. and used as the ground truth for training. In addition to distance, the ground truth for other object parameters such as direction, velocity, acceleration, etc. may be determined. For example, accurate distances and directions are determined as ground truths for identified objects. As another example, accurate velocity vectors are determined as ground truths for identified objects, such as vehicles and pedestrians.

In various embodiments, vision data and related data are organized by timestamps and corresponding timestamps are used to synchronize the two data sets. In some embodiments, timestamps are used to synchronize a time series of data, such as a sequence of images and a corresponding sequence of related data. The data may be synchronized at capture time. For example, as each element of a time series is captured, a corresponding set of related data is captured and saved with the time series element. In various embodiments, the time period of the related data is configurable and/or matches the time period of the time series of elements. In some embodiments, the related data is sampled at the same rate as the time series elements.

In various embodiments, only by examining the time series of data can the ground truth be determined. For example, analysis of only a subset of vision data may misidentify objects and/or their properties. By expanding the analysis across the entire time series, ambiguities are removed. For example, an occluded vehicle may be revealed earlier or later in the time series. Once identified, the sometimes-occluded vehicle can be tracked throughout the entire time series, even when occluded. Similarly, object properties for the sometimes-occluded vehicle can be tracked throughout the time series by associating the object properties from the related data to the identified object in the vision data. In some embodiments, the data is played backwards (and/or forwards) to determine any points of ambiguity when associating related data to vision data. The objects at different times in the time series may be used to help determine object properties for the objects across the entire time series.

In various embodiments, a threshold value is used to determine whether to is associate an object property as a ground truth of an identified object. For example, related data with a high degree of certainty is associated with an identified object while related data with a degree of certainty below a threshold value is not associated with the identified object. In some embodiments, the related data may be conflicting sensor data. For example, ultrasonic and radar data output may conflict. As another example, distance data may conflict with map data. The distance data may estimate a school zone begins in 30 meters while information from map data may describe the same school zone as starting in 20 meters. In the event the related data has a low degree of certainty, the related data may be discarded and not used to determine the ground truth.

In some embodiments, the ground truth is determined to predict semantic labels. For example, a detected vehicle can be labeled based on a predicted distance and direction as being in the left lane or right lane. In some embodiments, the detected vehicle can be labeled as being in a blind spot, as a vehicle that should be yielded to, or with another appropriate semantic label. In some embodiments, vehicles are assigned to roads or lanes in a map based on the determined ground truth. As additional examples, the determined ground truth can be used to label traffic lights, lanes, drivable space, or other features that assist autonomous driving.

At 209, the training data is packaged. For example, an element of vision data received at 201 is selected and associated with the ground truth determined at 207. In some embodiments, the element selected is an element of a time series. The selected element represents sensor data input, such as a training image, to a machine learning model and the ground truth represents the predicted result. In various embodiments, the selected data is annotated and prepared as training data. In some embodiments, the training data is packaged into training, validation, and testing data. Based on the determined ground truth and selected training element, the training data is packaged to train a machine learning model to predict the results related to one or more related auxiliary sensors. For example, the trained model can be used to accurately predict distances and directions of objects with results similar to measurements using sensors such as radar or lidar sensors. In various embodiments, the machine learning results are used to implement features for autonomous driving. The packaged training is data is now available for training a machine learning model.

Figure 3:
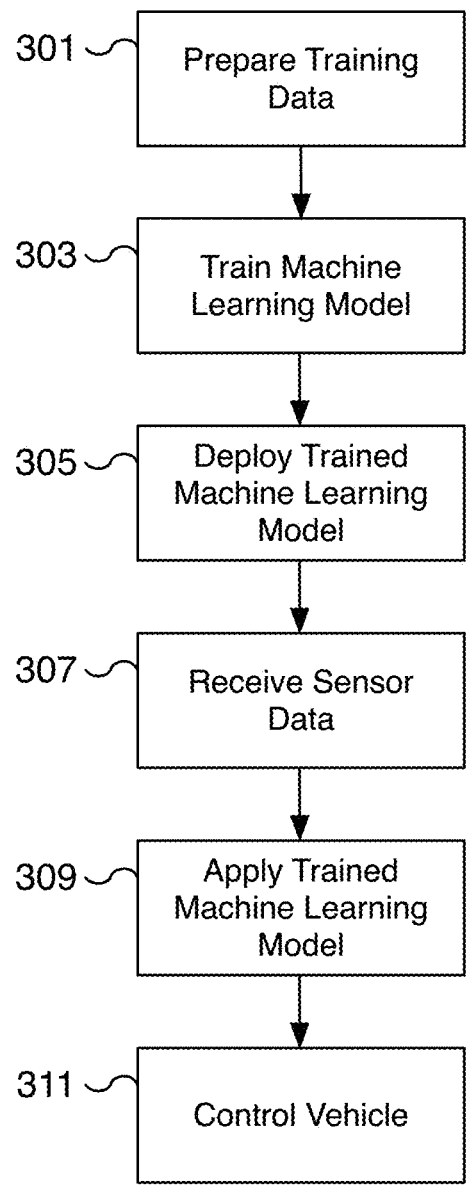
FIG. 3 is a flow diagram illustrating an embodiment of a process for training and applying a machine learning model for autonomous driving.

FIG. 3 is a flow diagram illustrating an embodiment of a process for training and applying a machine learning model for autonomous driving. For example, input data including a primary and secondary sensor data is received and processed to create training data for training a machine learning model. In some embodiments, the primary sensor data corresponds to image data captured via an autonomous driving system and the secondary sensor data corresponds to sensor data captured from an emitting distance sensor. The secondary sensor data may be used to annotate the primary sensor data to train a machine learning model to predict an output based on the secondary sensor. In some embodiments, the sensor data corresponds to sensor data captured based on particular use cases, such as the user manually disengaging autonomous driving or where distance estimates from vision data vary significantly from distance estimates from secondary sensors. In some embodiments, the primary sensor data is sensor data of vision sensors 101 of FIG. 1 and the secondary sensor data is sensor data of one or more sensors of additional sensors 103 of FIG. 1. In some embodiments, the process is used to create and deploy a machine learning model for deep learning system 100 of FIG. 1.

At 301, training data is prepared. In some embodiments, sensor data including image data and auxiliary data is received to create a training data set. The image data may include still images and/or video from one or more cameras. Additional sensors such as radar, lidar, ultrasonic, etc. may be used to provide relevant auxiliary sensor data. In various embodiments, the image data is paired with corresponding auxiliary data to help identify the properties of objects detected in the sensor data. For example, distance and/or velocity data from auxiliary data can be used to accurately estimate the distance and/or velocity of objects identified in the image data. In some embodiments, the sensor data is a time series of elements and is used to determine a ground truth. The ground truth of the group is then associated with a subset of the time series, such as a frame of image data. The selected element of the time series and the ground truth are used to prepare the training data. In some embodiments, the training data is prepared to train a machine learning model to only estimate properties of objects identified in the is image data, such as the distance and direction of vehicles, pedestrians, obstacles, etc. The prepared training data may include data for training, validation, and testing. In various embodiments, the sensor data may be of different formats. For example, sensor data may be still image data, video data, radar data, ultrasonic data, audio data, location data, odometry data, etc. The odometry data may include vehicle operation parameters such as applied acceleration, applied braking, applied steering, vehicle location, vehicle orientation, the change in vehicle location, the change in vehicle orientation, etc. In various embodiments, the training data is curated and annotated for creating a training data set. In some embodiments, a portion of the preparation of the training data may be performed by a human curator. In various embodiments, a portion of the training data is generated automatically from data captured from vehicles, greatly reducing the effort and time required to build a robust training data set. In some embodiments, the format of the data is compatible with a machine learning model used on a deployed deep learning application. In various embodiments, the training data includes validation data for testing the accuracy of the trained model. In some embodiments, the process of FIG. 2 is performed at 301 of FIG. 3.

At 303, a machine learning model is trained. For example, a machine learning model is trained using the data prepared at 301. In some embodiments, the model is a neural network such as a convolutional neural network (CNN). In various embodiments, the model includes multiple intermediate layers. In some embodiments, the neural network may include multiple layers including multiple convolution and pooling layers. In some embodiments, the training model is validated using a validation data set created from the received sensor data. In some embodiments, the machine learning model is trained to predict an output of a sensor such as a distance emitting sensor from a single input image. For example, a distance and direction property of an object can be inferred from an image captured from a camera. As another example, a velocity vector of a neighboring vehicle including whether the vehicle will attempt to merge is predicted from an image captured from a camera.

At 305, the trained machine learning model is deployed. For example, the trained is machine learning model is installed on a vehicle as an update for a deep learning network, such as deep learning network 107 of FIG. 1. In some embodiments, an over-the-air update is used to install the newly trained machine learning model. For example, an over-the-air update can be received via a network interface of the vehicle such as network interface 113 of FIG. 1. In some embodiments, the update is a firmware update transmitted using a wireless network such as a WiFi or cellular network. In some embodiments, the new machine learning model may be installed when the vehicle is serviced.

At 307, sensor data is received. For example, sensor data is captured from one or more sensors of the vehicle. In some embodiments, the sensors are vision sensors 101 of FIG. 1. The sensors may include image sensors such as a fisheye camera mounted behind a windshield, forward or side-facing cameras mounted in the pillars, rear-facing cameras, etc. In various embodiments, the sensor data is in the format or is converted into a format that the machine learning model trained at 303 utilizes as input. For example, the sensor data may be raw or processed image data. In some embodiments, the sensor data is preprocessed using an image pre-processor such as image pre-processor 105 of FIG. 1 during a pre-processing step.

For example, the image may be normalized to remove distortion, noise, etc. In some alternative embodiments, the received sensor data is data captured from ultrasonic sensors, radar, LiDAR sensors, microphones, or other appropriate technology and used as the expected input to the trained machine learning model deployed at 305.

At 309, the trained machine learning model is applied. For example, the machine learning model trained at 303 is applied to sensor data received at 307. In some embodiments, the application of the model is performed by an AI processor such as AI processor 109 of FIG. 1 using a deep learning network such as deep learning network 107 of FIG. 1. In various embodiments, by applying the trained machine learning model, one or more object properties such as an object distance, direction, and/or velocity are predicted from image data. For example, different objects are identified in the image data and an object distance and direction for each identified object are inferred using the trained machine learning model. As another example, a velocity vector of a vehicle is inferred for a vehicle identified in the image data. The velocity vector may be used to determine whether the neighboring vehicle is likely to cut into the is current lane and/or the likelihood the vehicle is a safety risk. In various embodiments, vehicles, pedestrians, obstacles, lanes, traffic control signals, map features, speed limits, drivable space, etc. and their related properties are identified by applying the machine learning model. In some embodiments, the features are identified in three-dimensions, such as a three-dimensional velocity vector.

At 311, the autonomous vehicle is controlled. For example, one or more autonomous driving features are implemented by controlling various aspects of the vehicle. Examples may include controlling the steering, speed, acceleration, and/or braking of the vehicle, maintaining the vehicle's position in a lane, maintaining the vehicle's position relative to other vehicles and/or obstacles, providing a notification or warning to the occupants, etc. Based on the analysis performed at 309, a vehicle's steering and speed may be controlled to maintain the vehicle safely between two lane lines and at a safe distance from other objects. For example, distances and directions of neighboring objects are predicted and a corresponding drivable space and driving path is identified. In various embodiments, a vehicle control module such as vehicle control module 111 of FIG. 1 controls the vehicle.

Figure 4:
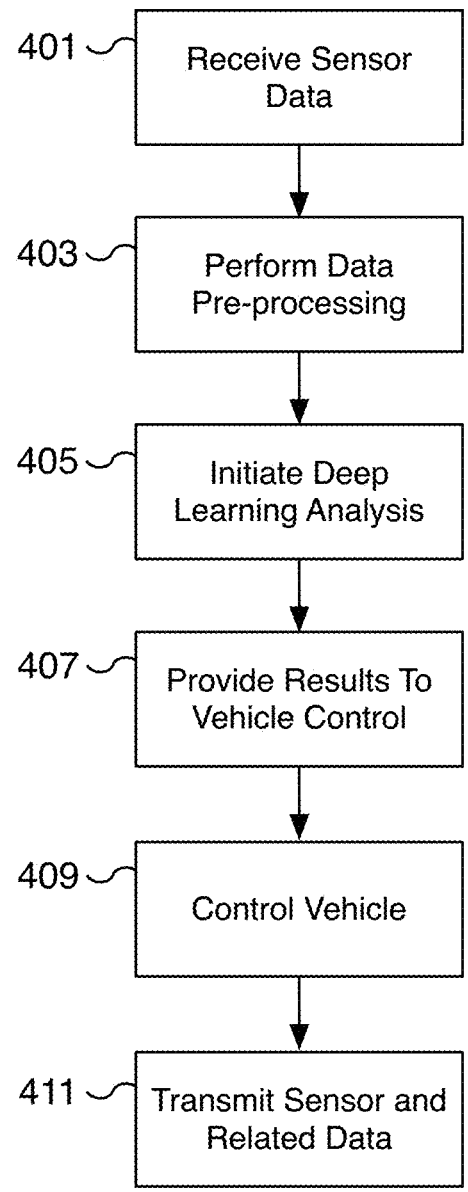
FIG. 4 is a flow diagram illustrating an embodiment of a process for training and applying a machine learning model for autonomous driving.

FIG. 4 is a flow diagram illustrating an embodiment of a process for training and applying a machine learning model for autonomous driving. In some embodiments, the process of FIG. 4 is utilized to collect and retain sensor data for training a machine learning model for autonomous driving. In some embodiments, the process of FIG. 4 is implemented on a vehicle enabled with autonomous driving whether the autonomous driving control is enabled or not. For example, sensor data can be collected in the moments immediately after autonomous driving is disengaged, while a vehicle is being driven by a human driver, and/or while the vehicle is being autonomously driven. In some embodiments, the techniques described by FIG. 4 are implemented using the deep learning system of FIG. 1. In some embodiments, portions of the process of FIG. 4 are performed at 307, 309, and/or 311 of FIG. 3 as part of the process of applying a machine learning model for autonomous driving.

At 401, sensor data is received. For example, a vehicle equipped with sensors is captures sensor data and provides the sensor data to a neural network running on the vehicle. In some embodiments, the sensor data may be vision data, ultrasonic data, radar data, LiDAR data, or other appropriate sensor data. For example, an image is captured from a high dynamic range forward-facing camera. As another example, ultrasonic data is captured from a side-facing ultrasonic sensor. In some embodiments, a vehicle is affixed with multiple sensors for capturing data. For example, in some embodiments, eight surround cameras are affixed to a vehicle and provide 360 degrees of visibility around the vehicle with a range of up to 250 meters. In some embodiments, camera sensors include a wide forward camera, a narrow forward camera, a rear view camera, forward looking side cameras, and/or rearward looking side cameras. In some embodiments, ultrasonic and/or radar sensors are used to capture surrounding details. For example, twelve ultrasonic sensors may be affixed to the vehicle to detect both hard and soft objects.

In various embodiments, the captured data from different sensors is associated with captured metadata to allow the data captured from different sensors to be associated together. For example, the direction, field of view, frame rate, resolution, timestamp, and/or other captured metadata is received with the sensor data. Using the metadata, different formats of sensor data can be associated together to better capture the environment surrounding the vehicle. In some embodiments, the sensor data includes odometry data including the location, orientation, change in location, and/or change in orientation, etc. of the vehicle. For example, location data is captured and associated with other sensor data captured during the same time frame. As one example, the location data captured at the time that image data is captured is used to associate location information with the image data. In various embodiments, the received sensor data is provided for deep learning analysis.

At 403, the sensor data is pre-processed. In some embodiments, one or more pre-y) processing passes may be performed on the sensor data. For example, the data may be pre-processed to remove noise, to correct for alignment issues and/or blurring, etc. In some embodiments, one or more different filtering passes are performed on the data. For example, a high-pass filter may be performed on the data and a low-pass filter may be performed on the data to separate out different components of the sensor data. In various embodiments, the pre-processing step performed at 403 is optional and/or may be incorporated into the neural network.

At 405, deep learning analysis of the sensor data is initiated. In some embodiments, the deep learning analysis is performed on the sensor data received at 401 and optionally pre-processed at 403. In various embodiments, the deep learning analysis is performed using a neural network such as a convolutional neural network (CNN). In various embodiments, the machine learning model is trained offline using the process of FIG. 3 and deployed onto the vehicle for performing inference on the sensor data. For example, the model may be trained to predict object properties such as distance, direction, and/or velocity. In some embodiments, the model is trained to identify pedestrians, moving vehicles, parked vehicles, obstacles, road lane lines, drivable space, etc., as appropriate. In some embodiments, a bounding box is determined for each identified object in the image data and a distance and direction is predicted for each identified object. In some embodiments, the bounding box is a three-dimensional bounding box such as a cuboid. The bounding box outlines the exterior surface of the identified object and may be adjusted based on the size of the object. For example, different sized vehicles are represented using different sized bounding boxes (or cuboids). In some embodiments, the object properties estimated by the deep learning analysis are compared to properties measured by sensors and received as sensor data. In various embodiments, the neural network includes multiple layers including one or more intermediate layers and/or one or more different neural networks are utilized to analyze the sensor data. In various embodiments, the sensor data and/or the results of deep learning analysis are retained and transmitted at 411 for the automatic generation of training data.

In various embodiments, the deep learning analysis is used to predict additional features. The predicted features may be used to assist autonomous driving. For example, a detected vehicle can be assigned to a lane or road. As another example, a detected vehicle can be determined to be in a blind spot, to be a vehicle that should be yielded to, to be a vehicle in the left adjacent lane, to be a vehicle in the right adjacent lane, or to have another appropriate attribute. Similarly, the deep learning analysis can identify traffic lights, drivable space, pedestrians, obstacles, or other appropriate features for driving.

At 407, the results of deep learning analysis are provided to vehicle control. For example, the results are provided to a vehicle control module to control the vehicle for is autonomous driving and/or to implement autonomous driving functionality. In some embodiments, the results of deep learning analysis at 405 are passed through one or more additional deep learning passes using one or more different machine learning models. For example, identified objects and their properties (e.g., distance, direction, etc.) may be used to determine drivable space. The drivable space is then used to determine a drivable path for the vehicle. Similarly, in some embodiments, a predicted vehicle velocity vector is detected. The determined path for the vehicle based at least in part on a predicted velocity vector is used to predict cut-ins and to avoid potential collisions. In some embodiments, the various outputs of deep learning are used to construct a three-dimensional representation of the vehicle's environment for autonomous driving which includes identified objects, the distance and direction of identified objects, predicted paths of vehicles, identified traffic control signals including speed limits, obstacles to avoid, road conditions, etc. In some embodiments, the vehicle control module utilizes the determined results to control the vehicle along a determined path. In some embodiments, the vehicle control module is vehicle control module 111 of FIG. 1.

At 409, the vehicle is controlled. In some embodiments, a vehicle with autonomous driving activated is controlled using a vehicle control module such as vehicle control module 111 of FIG. 1. The vehicle control can modulate the speed and/or steering of the vehicle, for example, to maintain a vehicle at a safe distance from other vehicles and in a lane at an appropriate speed in consideration of the environment around it. In some embodiments, the results are used to adjust the vehicle in anticipation that a neighboring vehicle will merge into the same lane. In various embodiments, using the results of deep learning analysis, a vehicle control module determines the appropriate manner to operate the vehicle, for example, along a determined path with the appropriate speed. In various embodiments, the result of vehicle controls such as a change in speed, application of braking, adjustment to steering, etc. are retained and used for the automatic generation of training data. In various embodiments, the vehicle control parameters may be retained and transmitted at 411 for the automatic generation is of training data.

At 411, sensor and related data are transmitted. For example, the sensor data received at 401 along with the results of deep learning analysis at 405 and/or vehicle control parameters used at 409 are transmitted to a computer server for the automatic generation of training data. In some embodiments, the data is a time series of data and the various gathered data are associated together by a remote training computer server. For example, image data is associated with auxiliary sensor data, such as distance, direction, and/or velocity data, to generate a ground truth. In various embodiments, the collected data is transmitted wirelessly, for example, via a WiFi or cellular connection, from a vehicle to a training data center. In some embodiments, metadata is transmitted along with the sensor data. For example, metadata may include the time of day, a timestamp, the location, the type of vehicle, vehicle control and/or operating parameters such as speed, acceleration, braking, whether autonomous driving was enabled, steering angle, odometry data, etc. Additional metadata includes the time since the last previous sensor data was transmitted, the vehicle type, weather conditions, road conditions, etc. In some embodiments, the transmitted data is anonymized, for example, by removing unique identifiers of the vehicle. As another example, data from similar vehicle models is merged to prevent individual users and their use of their vehicles from being identified.

In some embodiments, the data is only transmitted in response to a trigger. For example, in some embodiments, an inaccurate prediction triggers the transmitting of image sensor and auxiliary sensor data for automatically collecting data to create a curated set of examples for improving the prediction of a deep learning network. For example, a prediction performed at 405 to estimate the distance and direction of a vehicle using only image data is determined to be inaccurate by comparing the prediction to distance data from an emitting distance sensor. In the event the prediction and actual sensor data differ by more than a threshold amount, the image sensor data and related auxiliary data are transmitted and used to automatically generate training data. In some embodiments, the trigger may be used to identify particular scenarios such as sharp curves, forks in the roads, lane merges, sudden stops, intersections, or another appropriate scenario where additional training data is helpful and may be difficult to gather. For example, a trigger can be based on the sudden deactivation or is disengagement of autonomous driving features. As another example, vehicle operating properties such as the change in speed or change in acceleration can form the basis of a trigger. In some embodiments, a prediction with an accuracy that is less than a certain threshold triggers transmitting the sensor and related auxiliary data. For example, in certain scenarios, a prediction may not have a Boolean correct or incorrect result and is instead evaluated by determining an accuracy value of the prediction.

In various embodiments, the sensor and related auxiliary data are captured over a period of time and the entire time series of data is transmitted together. The time period may be configured and/or be based on one or more factors such as the speed of the vehicle, the distance traveled, the change in speed, etc. In some embodiments, the sampling rate of the captured sensor and/or related auxiliary data is configurable. For example, the sampling rate is increased at higher speeds, during sudden braking, during sudden acceleration, during hard steering, or another appropriate scenario when additional fidelity is needed.

Figure 5:
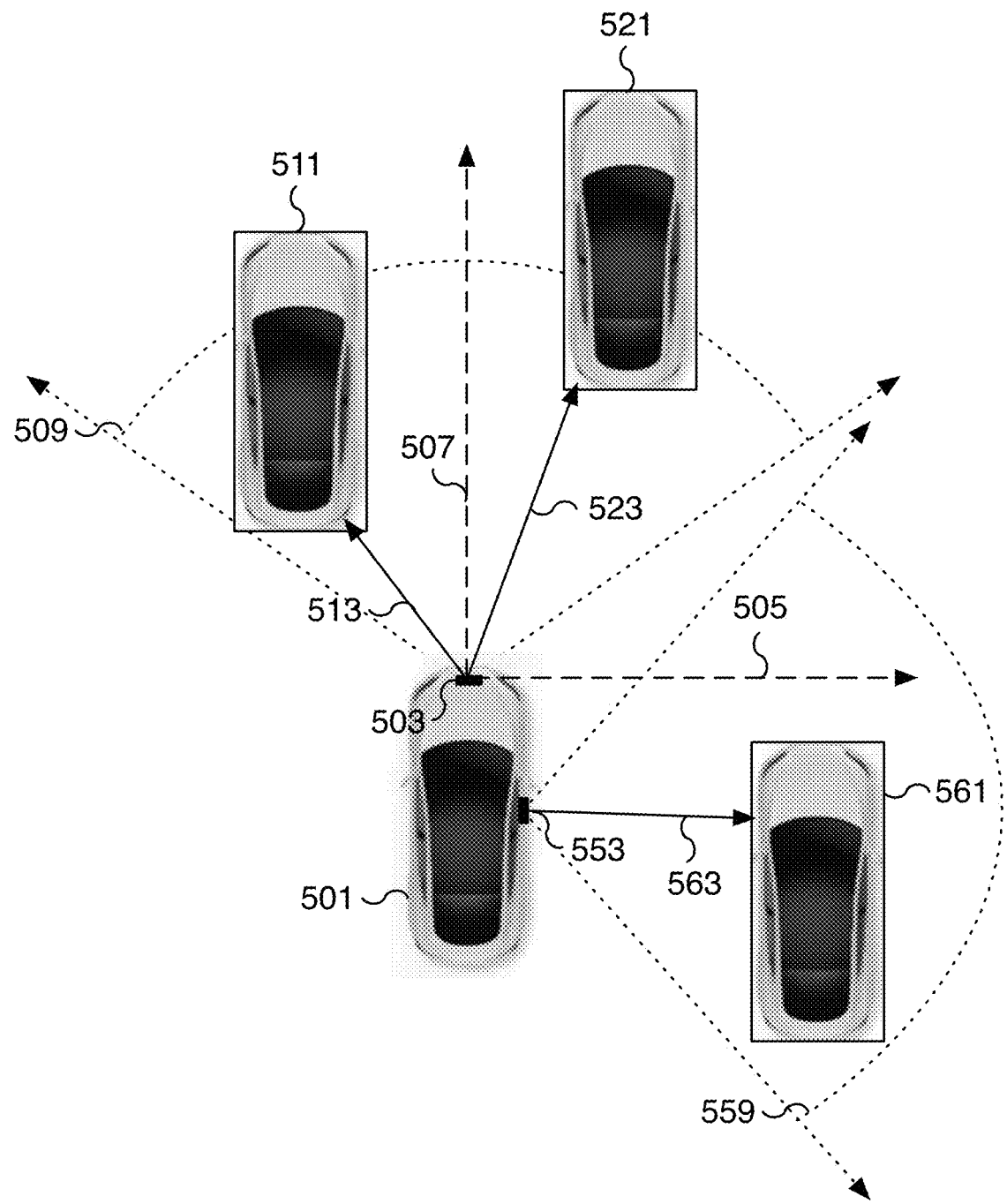
FIG. 5 is a diagram illustrating an example of capturing auxiliary sensor data for training a machine learning network.

FIG. 5 is a diagram illustrating an example of capturing auxiliary sensor data for training a machine learning network. In the example shown, autonomous vehicle 501 is equipped with at least sensors 503 and 553 and captures sensor data used to measure object properties of neighboring vehicles 511, 521, and 561. In some embodiments, the captured sensor data is captured and processed using a deep learning system such as deep learning system 100 of FIG. 1 installed on autonomous vehicle 501. In some embodiments, sensors 503 and 553 are additional sensors 103 of FIG. 1. In some embodiments, the data captured is the data related to vision data received at 203 of FIG. 2 and/or part of the sensor data received at 401 of FIG. 4.

In some embodiments, sensors 503 and 553 of autonomous vehicle 501 are emitting distance sensors such as radar, ultrasonic, and/or lidar sensors. Sensor 503 is a forward-facing sensor and sensor 553 is a right-side facing sensor. Additional sensors, such as rear-m facing and left-side facing sensors (not shown) may be attached to autonomous vehicle 501.

Axes 505 and 507, shown with long-dotted arrows, are reference axes of autonomous vehicle 501 and may be used as reference axes for data captured using sensor 503 and/or sensor 553. In the example shown, axes 505 and 507 are centered at sensor 503 and at the front of autonomous vehicle 501. In some embodiments, an additional height axis (not shown) is used to track is properties in three-dimensions. In various embodiments, alternative axes may be utilized. For example, the reference axis may be the center of autonomous vehicle 501. In some embodiments, each sensor of sensors 503 and 553 may utilize its own reference axes and coordinate system. The data captured and analyzed using the respective local coordinate systems of sensors 503 and 553 may be converted into a local (or world) coordinate system of autonomous vehicle 501 so that the data captured from different sensors can be shared using the same frame of reference.

In the example shown, field of views 509 and 559 of sensors 503 and 553, respectively, are depicted by dotted arcs between dotted arrows. The depicted fields of views 509 and 559 show the overhead perspective of the regions measured by sensors 503 and 553, respectively. Properties of objects in field of view 509 may be captured by sensor 503 and properties of objects in field of view 559 may be captured by sensor 553. For example, in some embodiments, distance, direction, and/or velocity measurements of objects in field of view 509 are captured by sensor 503. In the example shown, sensor 503 captures the distance and direction of neighboring vehicles 511 and 521. Sensor 503 does not measure neighboring vehicle 561 since neighboring vehicle 561 is outside the region of field of view 509. Instead, the distance and direction of neighboring vehicle 561 is captured by sensor 553. In various embodiments, objects not captured by one sensor may be captured by another sensor of a vehicle. Although depicted in FIG. 5 with only sensors 503 and 553, autonomous vehicle 501 may be equipped with multiple surround sensors (not shown) that provide 360 degrees of visibility around the vehicle.

In some embodiments, sensors 503 and 553 capture distance and direction measurements. Distance vector 513 depicts the distance and direction of neighboring vehicle 511, distance vector 523 depicts the distance and direction of neighboring vehicle 521, and distance vector 563 depicts the distance and direction of neighboring vehicle 561. In various embodiments, the actual distance and direction values captured are a set of values corresponding to the exterior surface detected by sensors 503 and 553. In the example shown, the set of distances and directions measured for each neighboring vehicle are approximated by distance vectors 513, 523, and 563. In some embodiments, sensors 503 and 553 detect a velocity vector (not shown) of objects in their respective fields of views 509 and 559. In some embodiments, is the distance and velocity vectors are three-dimensional vectors. For example, the vectors include height (or altitude) components (not shown).

In some embodiments, bounding boxes approximate detected objects including detected neighboring vehicles 511, 521, and 561. The bounding boxes approximate the exterior of the detected objects. In some embodiments, the bounding boxes are three-dimensional bounding boxes such as cuboids or another volumetric representation of the detected object. In the example of FIG. 5, the bounding boxes are shown as rectangles around neighboring vehicles 511, 521, and 561. In various embodiments, a distance and direction from autonomous vehicle 501 can be determined for each point on the edge (or surface) of a bounding box.

In various embodiments, distance vectors 513, 523, and 563 are related data to vision data captured in the same moment. The distance vectors 513, 523, and 563 are used to annotate distance and direction of neighboring vehicles 511, 521, and 561 identified in the corresponding vision data. For example, distance vectors 513, 523, and 563 may be used as the ground truth for annotating a training image that includes neighboring vehicles 511, 521, and 561. In some embodiments, the training image corresponding to the captured sensor data of FIG. 5 utilizes data captured from sensors with overlapping fields of view and captured at matching times. For example, in the event a training image is image data captured from a forward facing camera that only captures neighboring vehicles 511 and 521 and not neighboring vehicle 561, only neighboring vehicles 511 and 521 are identified in the training image and have their corresponding distance and directions annotated. Similarly, a right-side image capturing neighboring vehicle 561 includes annotations for the distance and direction of only neighboring vehicle 561. In various embodiments, annotated training images are transmitted to a training server for training a machine learning model to predict the annotated object properties. In some embodiments, the captured sensor data of FIG. 5 and corresponding vision data are transmitted to a training platform where they are analyzed and training images are selected and annotated. For example, the captured data may be a time series of data and the time series is analyzed to associate the related data to objects identified in the vision data.

Figure 6:
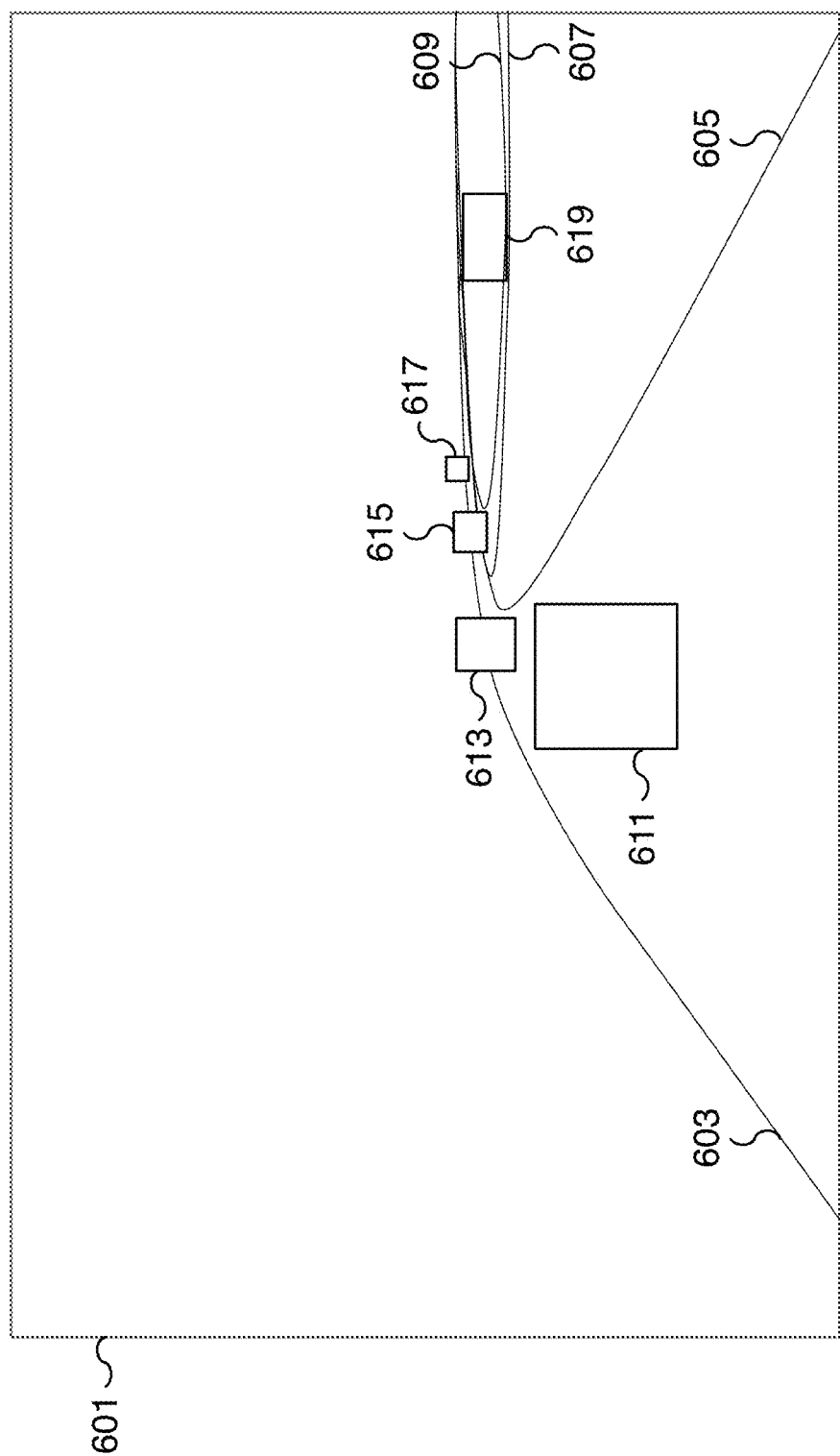
FIG. 6 is a diagram illustrating an example of predicting object properties.

FIG. 6 is a diagram illustrating an example of predicting object properties. In the example shown, analyzed vision data 601 represents the perspective of image data captured is from a vision sensor, such as a forward-facing camera, of an autonomous vehicle. In some embodiments, the vision sensor is one of vision sensors 101 of FIG. 1. In some embodiments, the vehicle's forward environment is captured and processed using a deep learning system such as deep learning system 100 of FIG. 1. In various embodiments, the process illustrated in FIG. 6 is performed at 307, 309, and/or 311 of FIG. 3 and/or at 401, 403, 405, 407, and/or 409 of FIG. 4.

In the example shown, analyzed vision data 601 captures the forward facing environment of an autonomous vehicle. Analyzed vision data 601 includes detected vehicle lane lines 603, 605, 607, and 609. In some embodiments, the vehicle lane lines are identified using a deep learning system such as deep learning system 100 of FIG. 1 trained to identify driving features. Analyzed vision data 601 also includes bounding boxes 611, 613, 615, 617, and 619 that correspond to detected objects. In various embodiments, the detected objects represented by bounding boxes 611, 613, 615, 617, and 619 are identified by analyzing captured vision data. Using the captured vision data as input to a trained machine learning model, object properties such as distances and direction of the detected objects are predicted. In some embodiments, velocity vectors are predicted. In the example shown, the detected objects of bounding boxes 611, 613, 615, 617, and 619 correspond to neighboring vehicles. Bounding boxes 611, 613, and 617 correspond to vehicles in the lane defined by vehicle lane lines 603 and 605. Bounding boxes 615 and 619 correspond to vehicles in the merging lane defined by vehicle lane lines 607 and 609. In some embodiments, bounding boxes used to represent detected objects are three-dimensional bounding boxes (not shown).

In various embodiments, the object properties predicted for bounding boxes 611, 613, 615, 617, and 619 are predicted by applying a machine learning model trained using the processes of FIGS. 2-4. The object properties predicted may be captured using auxiliary sensors as depicted in the diagram of FIG. 5. Although FIG. 5 and FIG. 6 depict different driving scenarios—FIG. 5 depicts a different number of detected objects and in different positions compared to FIG. 6—a trained machine learning model can accurately predict object properties for the objects detected in the scenario of FIG. 6 when trained on sufficient training data. In some embodiments, the distance and direction is predicted. In some embodiments, the velocity is predicted. The predicted properties may be predicted in two or three-dimensions. By is automating the generation of training data using the processes described with respect to FIGS. 1-6, training data for accurate predictions is generated in an efficient and expedient manner. In some embodiments, the identified objects and corresponding properties can be used to implement autonomous driving features such as self-driving or driver-assisted operation of a vehicle. For example, a vehicle's steering and speed may be controlled to maintain the vehicle safely between two lane lines and at a safe distance from other objects.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method implemented by a processor included in a vehicle, the method comprising:
   receiving a time series training set comprising a plurality of images captured over a period of time, the images depicting an object proximate to a vehicle and being associated with respective timestamps, wherein the time series training set is associated with label information indicating, at least, respective distances of the object with respect to the vehicle and auxiliary data associated with the vehicle;
   training a machine learning model based on the time series training set; and
   providing the machine learning model for execution by one or more other vehicles, wherein the machine learning model is configured to output distance information associated with objects.

2. The method of claim 1, wherein the auxiliary data comprises velocities of the vehicle.

3. The method of claim 1, wherein the auxiliary data comprises headings of the vehicle.

4. The method of claim 1, wherein the trained machine learning model is configured to generate output without using distance information from emitting sensors.

5. The method of claim 1, wherein the machine learning model is configured to output velocity information associated with objects.

6. A system comprising one or more processors and non-transitory computer storage media storing instructions that when executed by the one or more processors cause the processors to perform operations comprising:
   receiving a time series training set comprising a plurality of images captured over a period of time, the images depicting an object proximate to a vehicle and being associated with respective timestamps, wherein the time series training set is associated with label information indicating, at least, respective distances of the object with respect to the vehicle and auxiliary data associated with the vehicle;
   training a machine learning model based on the time series training set; and
   providing the machine learning model for execution by one or more other vehicles, wherein the machine learning model is configured to output distance information associated with objects.

7. The system of claim 6, wherein the auxiliary data comprises velocities of the vehicle.

8. The system of claim 6, wherein the auxiliary data comprises headings of the vehicle.

9. The system of claim 6, wherein the trained machine learning model is configured to generate output without using distance information from emitting sensors.

10. The system of claim 6, wherein the machine learning model is configured to output velocity information associated with objects.

11. Non-transitory computer storage media storing instructions that when executed by a system of one or more processors, cause the processors to perform operations comprising:
- receiving a time series training set comprising a plurality of images captured over a period of time, the images depicting an object proximate to a vehicle and being associated with respective timestamps, wherein the time series training set is associated with label information indicating, at least, respective distances of the object with respect to the vehicle and auxiliary data associated with the vehicle;
- training a machine learning model based on the time series training set; and
- providing the machine learning model for execution by one or more other vehicles, wherein the machine learning model is configured to output distance information associated with objects.

12. The computer storage media of claim 11, wherein the auxiliary data comprises velocities of the vehicle.

13. The computer storage media of claim 11, wherein the auxiliary data comprises headings of the vehicle.

14. The computer storage media of claim 11, wherein the trained machine learning model is configured to generate output without using distance information from emitting sensors.

15. The computer storage media of claim 11, wherein the machine learning model is configured to output velocity information associated with objects.

* * * * *